United States Patent
Xu et al.

(10) Patent No.: US 12,125,258 B2
(45) Date of Patent: Oct. 22, 2024

(54) DISTRIBUTED RETRIEVAL METHOD, APPARATUS, AND SYSTEM, COMPUTER DEVICE, AND STORAGE MEDIUM

(71) Applicant: Tencent Technology (Shenzhen) Company Limited, Shenzhen (CN)

(72) Inventors: Songlin Xu, Shenzhen (CN); Yanbin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 391 days.

(21) Appl. No.: 17/665,404

(22) Filed: Feb. 4, 2022

(65) Prior Publication Data

US 2022/0157043 A1 May 19, 2022

Related U.S. Application Data

(63) Continuation of application No. PCT/CN2020/130248, filed on Nov. 19, 2020.

(30) Foreign Application Priority Data

Jan. 17, 2020 (CN) .......................... 202010051528.7

(51) Int. Cl.
*G06V 10/75* (2022.01)
*G06T 1/60* (2006.01)
*G06V 10/74* (2022.01)

(52) U.S. Cl.
CPC ............. *G06V 10/751* (2022.01); *G06T 1/60* (2013.01); *G06V 10/761* (2022.01)

(58) Field of Classification Search
None
See application file for complete search history.

(56) References Cited

U.S. PATENT DOCUMENTS

| 8,356,026 B2 * | 1/2013 | Heimendinger | ...... G06F 16/245 707/718 |
| 2008/0285652 A1 * | 11/2008 | Oxman | .................. H04N 19/16 375/240.16 |

(Continued)

FOREIGN PATENT DOCUMENTS

| CN | 101315628 A | * | 12/2008 | |
| CN | 108304431 A | * | 7/2018 | ............. G06F 16/51 |

(Continued)

OTHER PUBLICATIONS

Tencent Technology, WO, PCT/CN2020/130248, Feb. 7, 2021, 5 pgs.

(Continued)

*Primary Examiner* — Henok Shiferaw
(74) *Attorney, Agent, or Firm* — Morgan, Lewis & Bockius LLP

(57) ABSTRACT

Embodiments of this application disclose a distributed retrieval method performed by a distributed retrieval system including a retrieval node and an access node. The retrieval node receives a retrieval request forwarded by an access node, at least two video memory blocks are searched for matching features matching a to-be-detected feature of an image, each video memory block being a unique physical storage unit with a fixed length, and then returns retrieval results to the access node, the retrieval results being used for indicating the features matching the to-be-detected feature. Because cache spaces are allocated between the at least two video memory blocks using a blockchain structure, the features can be continuously stored in the video memory blocks, thereby overcoming the problem of data discretization brought about by a storage hole caused by deletion in the related art.

15 Claims, 12 Drawing Sheets

(56) References Cited

U.S. PATENT DOCUMENTS

| | | | | |
|---|---|---|---|---|
| 2010/0318538 A1* | 12/2010 | Wyman | ............... | G06F 16/3349 |
| | | | | 707/769 |
| 2016/0224641 A1* | 8/2016 | Elias | .................... | G06F 16/2358 |
| 2016/0266932 A1* | 9/2016 | Phelan | ................... | G06F 9/5027 |
| 2017/0039238 A1* | 2/2017 | Elias | ................. | G06F 16/24552 |
| 2021/0185142 A1* | 6/2021 | Paduroiu | ................ | H04L 65/60 |

FOREIGN PATENT DOCUMENTS

| | | |
|---|---|---|
| CN | 109885589 A | 6/2019 |
| CN | 111274288 A | 6/2020 |

OTHER PUBLICATIONS

Tencent Technology, IPRP, PCT/CN2020/130248, Jul. 19, 2022, 6 pgs.

Tencent Technology, ISR, PCT/CN2020/130248, Feb. 10, 2021, 2 pgs.

\* cited by examiner

DISTRIBUTED RETRIEVAL METHOD, APPARATUS, AND SYSTEM, COMPUTER DEVICE, AND STORAGE MEDIUM

CROSS-REFERENCE TO RELATED APPLICATIONS

This application is a continuation application of PCT Patent Application No. PCT/CN2020/130248, entitled "DISTRIBUTED RETRIEVAL METHOD, APPARATUS AND SYSTEM, COMPUTER DEVICE, AND STORAGE MEDIUM" filed on Nov. 19, 2020, which claims priority to Chinese Patent Application No. 202010051528.7, filed with the State Intellectual Property Office of the People's Republic of China on Jan. 17, 2020, and entitled "DISTRIBUTED RETRIEVAL METHOD, APPARATUS, AND SYSTEM, COMPUTER DEVICE, AND STORAGE MEDIUM", all of which are incorporated herein by reference in their entirety.

FIELD OF THE TECHNOLOGY

Embodiments of this application relate to the field of distribution technologies, and in particular, to a distributed retrieval method, apparatus, and system, a computer device, and a storage medium.

BACKGROUND OF THE DISCLOSURE

As users of social applications upload a large quantity of images, a large quantity of image data needs to be stored on the cloud. In an application scenario, features need to be extracted from image data, and the image features are stored.

In the related art, matching features matching a to-be-detected feature can be obtained from a large quantity of image features using the image retrieval technology. In the technology, the to-be-detected feature is compared with the large quantity of image features one by one in batches until retrieval results matching the feature are obtained.

The image features are stored using an array structure in the related art. Therefore, when a feature is deleted from the array, a data hole occurs in the array, resulting in a decrease in the efficiency of comparing the to-be-detected feature with the image features.

SUMMARY

Embodiments of this application provide a distributed retrieval method, apparatus, and system, a computer device, and a storage medium, to improve the efficiency of comparing a to-be-detected feature with image features. The technical solutions are as follows:

According to content of an aspect of this application, a distributed retrieval method is performed by a retrieval node of a distributed retrieval system, the retrieval node including at least two video memory blocks, cache spaces being allocated between the at least two video memory blocks using a blockchain structure, the method including:
  receiving a retrieval request forwarded by an access node of the distributed retrieval system, the retrieval request being used for indicating a to-be-detected feature;
  searching the at least two video memory blocks for features matching the to-be-detected feature, the video memory block being a physical storage unit with a fixed length, and the video memory block including a specified quantity of storage units, the storage units corresponding to stored features; and
  returning retrieval results to the access node, the retrieval results being used for indicating the matching features.

According to content of an aspect of this application, a distributed retrieval system is provided, including:
  an access node, configured to a retrieval request from the outside of the system, the retrieval request being used for indicating a to-be-detected feature;
  a retrieval node, configured to receive the retrieval request forwarded by the access node,
  the retrieval node being configured to search at least two video memory blocks for features matching the to-be-detected feature, the video memory block being a physical storage unit with a fixed length, and the video memory block including a specified quantity of storage units, the storage units corresponding to stored features, and cache spaces being allocated to the video memory block and the other video memory block in the retrieval node using a blockchain structure;
  the retrieval node being configured to return retrieval results to the access node, the retrieval results being used for indicating the matching features matching the to-be-detected feature; and
  the access node being configured to provide the retrieval result.

According to content of another aspect of this application, a computer device is provided acting as a retrieval node of a distributed retrieval system, the retrieval node comprising at least two video memory blocks, cache spaces being allocated between the at least two video memory blocks using a blockchain structure, the computer device including a processor and a memory, the memory storing at least one instruction, the at least one instruction being loaded and executed by the processor to implement the distributed retrieval method provided by the embodiments of this application.

According to content of another aspect of this application, a non-transitory computer-readable storage medium is provided, the storage medium storing program instructions, the program instructions being loaded and executed by a processor of a computer device acting as a retrieval node of a distributed retrieval system to implement the distributed retrieval method provided by the embodiments of this application.

According to another aspect of the embodiments of this application, a computer program product or a computer program is provided, including computer instructions, the computer instructions being stored on a non-transitory computer-readable storage medium. A processor of a computer device reads the computer instructions from the computer-readable storage medium, and executes the computer instructions, so that the computer device performs the distributed retrieval method provided in the foregoing optional implementations.

In the embodiments of this application, a retrieval request forwarded by an access node can be received, at least two video memory blocks are searched for matching features matching a to-be-detected feature, the video memory block being a physical storage unit with a fixed length, and retrieval results are returned to the access node, the retrieval results being used for indicating the matching features matching the to-be-detected feature. In addition, in the embodiments of this application, a retrieval node includes at least two video memory blocks, cache spaces being allocated between the at least two video memory blocks using a blockchain structure, the apparatus including. Therefore, the features can be continuously stored in the video memory blocks, thereby overcoming the problem of data discretization brought about by a storage hole caused by deletion in the related art.

BRIEF DESCRIPTION OF THE DRAWINGS

To describe the technical solutions in the embodiments of this application more clearly, the accompanying drawings required for describing the embodiments of this application are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

Figure 1:
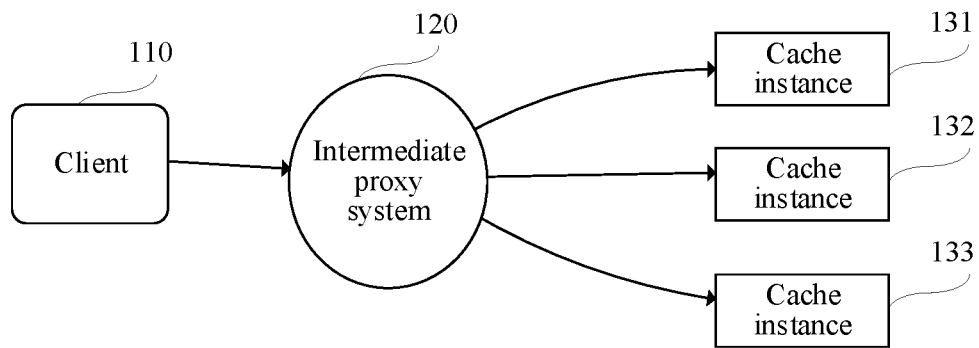
FIG. 1 is a schematic architectural diagram of a distributed cache system according to an embodiment of this application.

To make the objectives, technical solutions, and advantages of this application clearer, the following further describes implementations of this application in detail with reference to the accompanying drawings.

When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

In the description of this application, it can be understood that, terms "first" and "second" are used only for a purpose of description, and shall not be construed as indicating or implying relative importance. In the descriptions of this application, unless otherwise clearly specified and defined, terms such as "interconnection", and "connection" shall be understood in a broad sense, for example, may be a fixed connection, a detachable connection, or an integral connection; may be a mechanical connection or an electrical connection; and may be a direct connection or an indirect connection through an intermediate medium. A person of ordinary skill in the art may understand the specific meanings of the foregoing terms in this application according to specific situations. In addition, in the descriptions of this application, unless otherwise stated, "a plurality of" means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

To make the solutions illustrated in the embodiments of this application comprehensible, terms that appear in the embodiments of this application are described.

Feature: A feature is used for uniquely identifying an object in a picture. For example, the feature is a character string with a fixed length. The character string is a numeric character string. In an application scenario of this application, a feature service may be used at least one scenario of feature extraction of a face, feature extraction of a motor vehicle, feature extraction of a human body, or feature extraction of a non-motor vehicle. In the embodiments of this application, the feature extraction scenario is not limited. The feature extraction scenario of this application may be a feature extraction scenario of any specified type of visible object.

Retrieval: Retrieval is an operation for determining resultant pictures most related to a given picture. The given picture includes a target object, and the resultant pictures include objects with high similarities to the target object. For example, the target object may be a face. The retrieval process may be extracting a feature from the target object, and performing 1:N feature comparison in a specified feature library according to the feature. Results obtained by through the retrieval can be sorted in descending order of similarity, so as to obtain a plurality of pieces of object information with the highest similarities to the target object.

Optionally, the feature library on which the retrieval is based is a library that is pre-built by importing pictures including information about the target object. For example, for the retrieval, similarities between the feature of the target object and features in the feature library may be calculated using cosine distances or Euclidean distances.

CAP theorem: The CAP theorem is used to indicate that in a distributed system, consistency, availability, and partition tolerance cannot be established at the same time. The distributed system satisfies at most two of the foregoing three indicators at the same time.

Distributed lock: The distributed lock is a mechanism used to control different processes in a distributed system to synchronously access shared resources. If the different processes need to access the shared resources mutually exclusively, the different processes can prevent mutual interference through mutual exclusion. In view of the above, the distributed lock can improve the consistency of the distributed system.

Access node: The access node is configured to perform operations, such as parameter verification, authentication, and interception and filtering, in a distributed system for processing requests from the outside of the system. Optionally, for the outside of the distributed system, the access node can also perform a traffic sharing operation, thereby improving the performance, availability, and security of the distributed system. For example, the access node is configured to route requests received from the outside to a specified retrieval node in the system according to a specified routing policy, so as to maximize utilization of the computing capability of each retrieval node.

Retrieval node: In a distributed retrieval system, the retrieval node provides a local 1:N retrieval function. For example, the retrieval node is presented as a separate process. In a functional presentation of the retrieval node, the retrieval node has the function of providing a simple service in a standalone version for the outside of the distributed retrieval system. The retrieval node has a set of hardware resources that belong to itself, for example, a central processing unit (CPU), a graphics processing unit (GPU), a magnetic disk, and the like. For a plurality of retrieval nodes in the distributed retrieval system, the retrieval nodes can include a master retrieval node and a slave retrieval node.

With the wide application of image acquisition devices and social media at present, the resultant image data is stored on the cloud. In the wide development of image retrieval technologies, features can be extracted from the foregoing image data and used as a feature library serving image retrieval. Because the data amount of the feature library is huge, a distributed cache system is designed accordingly, and configured to store the feature library.

In an application mode, Codis is a commonly used distributed cache system. Codis is a solution for distributed Redis, and integrates CPU computing capabilities of a plurality of Redis instances to deal with high-concurrency read and write operations. FIG. 1 is a schematic architectural diagram of a distributed cache system according to an embodiment of this application. FIG. 1 includes a client 110, an intermediate proxy system 120, a cache instance 131, a cache instance 132, and a cache instance 133. For example, the intermediate proxy system 120 may be Codis, and the cache instance may be a Redis instance. There may be a plurality of cache instances.

In the distributed cache system shown in FIG. 1, the intermediate agent system 120 may divide all keys into 1024 slots using a consistent hash routing policy. Optionally, the keys may alternatively be configured into 2048 slots or 4096 slots. There are mapping relationships between the slots and the cache instances. According to a possible mapping relationship, a cache instance corresponding to a key may be obtained through hash(CRC32(key))% 1024.

For a scenario of capacity expansion of a distributed cache system, mapping relationships between the slots and the cache instances may change, and all the keys need to determine whether to migrate data according to new slot information. In a possible implementation, when slot information of a key does not change, the key does not need to migrate data. In another possible implementation, when slot information of a key changes, the key migrates data into a new slot.

However, Codis achieves master-slave synchronization between the plurality of Redis instances through the replication mechanism of the Redis instances. For example, in the cache instance 131, the cache instance 132, and the cache instance 133 shown in FIG. 1, if the cache instance 131 is a master retrieval node, and the cache instance 132 is a slave retrieval node, master-slave synchronization is achieved between the cache instance 131 and the cache instance 132 using the replication mechanism. In a possible emergency scenario, if the master retrieval node cache instance 131 is down during master-slave replication, and the cache instance 132 has not completed the synchronization operation, data in the master retrieval node cache instance 131 will be lost permanently, resulting in the problem of data consistency in the distributed cache system.

In the distributed cache system shown in FIG. 1, because Redis node adopts the consistent hash routing policy, during capacity expansion or contraction of the system, data migration may occur between cache instances. There may be data inconsistency during data migration, resulting in high migration costs and a risk of an avalanche effect.

According to another aspect, in the distributed cache system shown in FIG. 1, data of a small-scale feature library based on the consistent hash is distributed in a discrete state and cannot form sufficient continuity, resulting in a waste of computing resources.

According to still another aspect, the distributed cache system shown in FIG. 1 relies on the synchronization mechanism of Redis node to implement the synchronization mechanism for one master node and a plurality of slave nodes. When the master node is down and the slave nodes corresponding to the master node have not completed data synchronization, the distributed cache system has a risk of permanently losing data in the master node.

Figure 2:
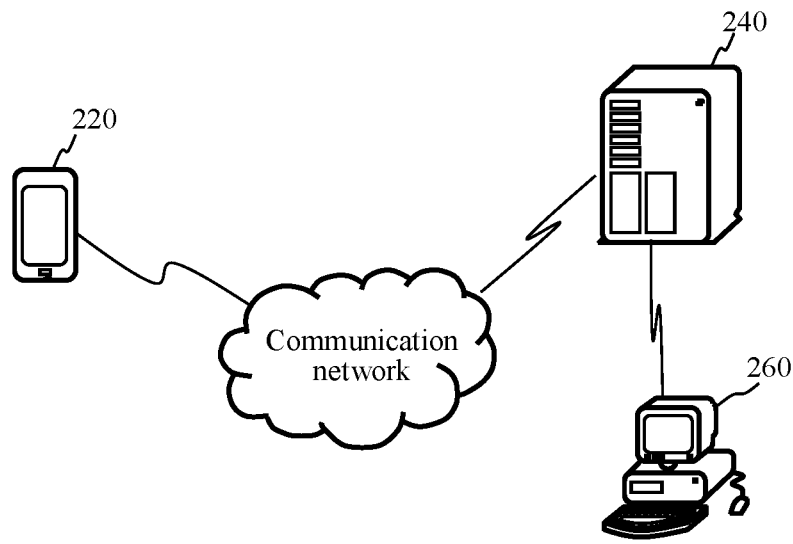
FIG. 2 is a schematic structural diagram of a privatized distributed feature library system according to an embodiment of this application.

FIG. 2 is a schematic structural diagram of a privatized distributed feature library system according to an embodiment of this application. The system includes: a plurality of terminals 220 and a server cluster 240.

The terminal 220 may be a mobile phone, a tablet computer, an ebook reader, smart glasses, a smartwatch, a Moving Picture Experts Group Audio Layer III (MP3) player, a Moving Picture Experts Group Audio Layer IV (MP4) player or the like. The terminal 220 may be used as user equipment using the privatized distributed feature library system, and use the privatized distributed feature library system deployed in the server cluster 240 for image retrieval.

The terminals 220 may perform communication with each other using short range wireless communication technologies. For example, the terminals 220 may perform communication with each other using at least one of the wireless fidelity (Wi-Fi) technology, the Bluetooth technology, or the Near Field Communication (NFC) technology.

An application program supporting a virtual scene may be installed on the terminal 220. Correspondingly, the server cluster 240 can be a server corresponding to the application program supporting the virtual scene.

The terminal 220 is connected to the server cluster 240 by a communication network. Optionally, the communication network is a wired network or a wireless network.

The server 240 is one or more servers, a virtualization platform, or a cloud computing service center. Because the embodiments of this application provide a privatized distributed feature library system, the server cluster 240 may include a plurality of servers, and the privatized distributed feature library system is deployed in the server cluster 240.

Figure 3:
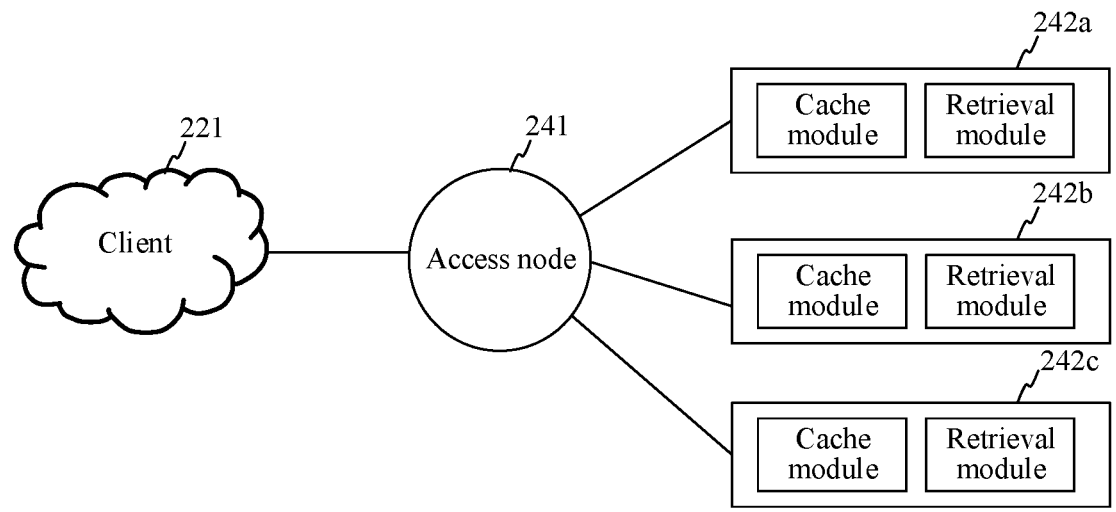
FIG. 3 is a node topology diagram provided based on the privatized distributed feature library system shown in FIG. 2.

For example, refer to FIG. 3. FIG. 3 is a node topology diagram provided based on the privatized distributed feature library system shown in FIG. 2.

In FIG. 3, the server cluster 240 may include an access node 241 and a retrieval node 242. A client 221 may be run on the terminal 220. The retrieval node 242 can include a retrieval node 242*a*, a retrieval node 242*b*, and a retrieval node 242*c*. Each retrieval node may include a cache module and a retrieval module. For example, the cache module provides a cache function, and supports basic database operations on the feature library. The basic database operations include addition, deletion, modification, and lookup. A read service provides a feature retrieval function. The feature retrieval function is used for performing feature retrieval in the feature library. The feature library is a database including features of pictures cached in the privatized distributed feature library system.

In a possible implementation, the access node 241 can be a proxy node. For example, the proxy node may be developed using the GO language. In a possible deployment mode, the proxy node may be deployed in a stateless manner with a plurality of duplicates. For the function of the access node 241, the access node 241 is mainly responsible for request authentication and parameter verification in the privatized distributed feature library system. When the access node 241 receives a retrieval request transmitted by the client 221, the access node 241 distributes the retrieval request using a first routing policy. The access node 241 may alternatively call a feature service (English: Hades Feature) from the privatized distributed feature library system to extract features from cached images, and cache feature data to a cache in a corresponding retrieval node through a second routing policy.

In a possible implementation, the retrieval node may be developed using a remote procedure call (RPC) framework. Optionally, the RPC framework may be the Baidu-RPC (BRPC) framework. In a possible deployment mode, stateful deployment is executed for the retrieval node. For the hardware configuration of the retrieval node, one retrieval node may correspond to one GPU video card or one CPU machine. In addition, the retrieval node may exclusively occupy hardware resources corresponding thereto.

Optionally, the privatized distributed feature library system shown in FIG. 2 may further include a management device 260. The management device 260 is connected to the server cluster 240 by a communication network. Optionally, the communication network is a wired network or a wireless network.

Optionally, the wireless network or the wired network uses a standard communication technology and/or protocol. The network is generally the Internet, but may be any network, including, but not limited to, any combination of a local area network (LAN), a metropolitan area network (MAN), a wide area network (WAN), a mobile, wired, or wireless network, and a dedicated network or a virtual private network. In some embodiments, technologies and/or formats, such as the HyperText Markup Language (HTML) and the Extensible Markup Language (XML), are used for representing data exchanged through the network. In addition, all or some links may be encrypted by using conventional encryption technologies such as a secure socket layer (SSL), transport layer security (TLS), a virtual private network (VPN), and internet protocol security (IPsec). In some other embodiments, customized and/or dedicated data communication technologies may alternatively be used in place of or in addition to the foregoing data communication technologies.

Figure 4:
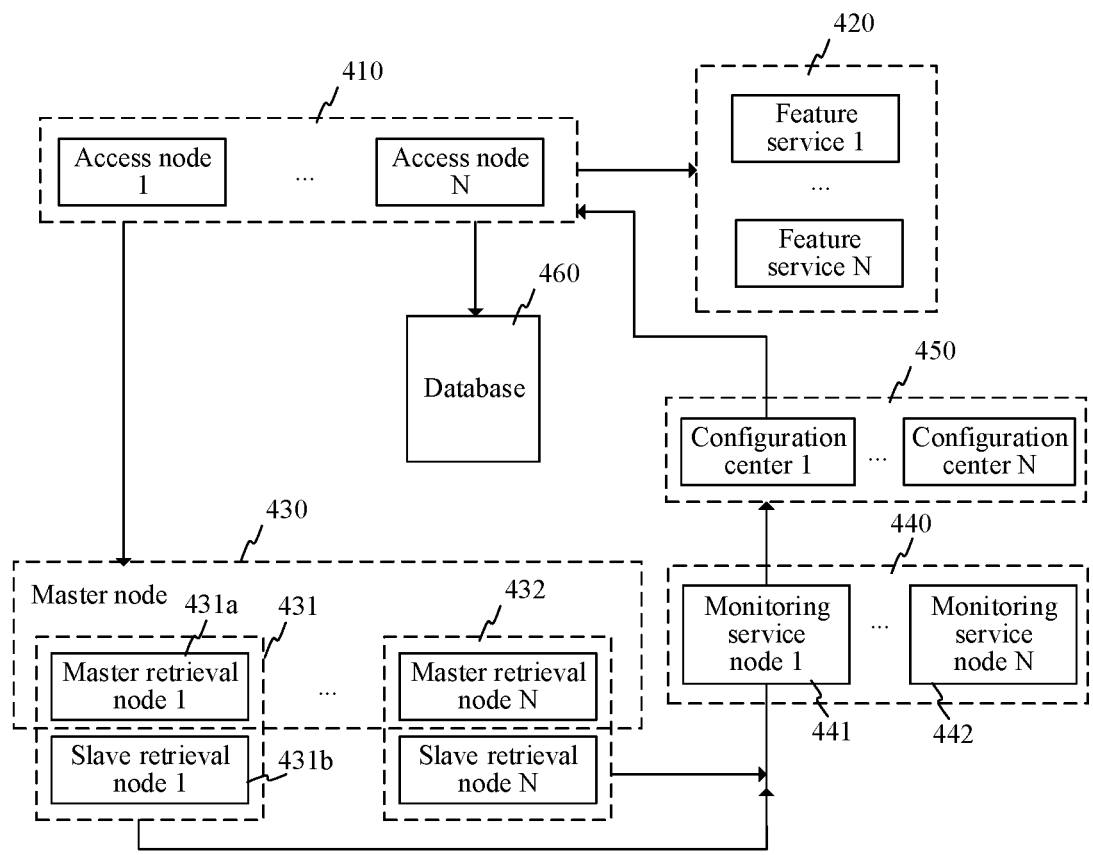
FIG. 4 is a framework diagram of a privatized distributed feature library system according to an embodiment of this application.

Based on the privatized distributed feature library system provided in the embodiments of this application, the embodiments of this application may further provide a design framework of the privatized distributed feature library. FIG. 4 is a framework diagram of a privatized distributed feature library system according to an embodiment of this application.

In FIG. 4, the privatized distributed feature library system includes an access node (English: Hades Access) 410, a feature service node (English: Hades Feature) 420, a retrieval node (English: Hades Node) 430, a monitoring service node (English: Hades Meta) 440, a configuration center (English: Hades Config) 450, and a database (English: Data Base) 460.

The access node 410 is configured to proxy addition, deletion, modification, and lookup operations on a feature library and a feature retrieval request. According to a specified routing policy, a plurality of retrieval nodes are scheduled to implement a distributed feature cache function and a distributed feature retrieval function. The access node 410 is connected to the feature service node 420. When the access node 410 is configured to record features of pictures, the feature service node 420 is called to extract features of objects in the pictures. For example, the object includes at least one of a face, a vehicle, or a human body.

The feature service node 420 is configured to provide a feature extraction service. In a possible implementation, the feature service node 420 provides a face feature service. The face feature service includes a face detection operation, a registration operation, and a feature extraction service. In another possible implementation, the feature service node 420 provides a vehicle feature service. The vehicle feature service includes a vehicle detection operation and a feature extraction service. In a possible implementation, the feature service node 420 provides a human body feature service. The human body feature service includes a human body detection operation and a feature extraction service.

The retrieval node 430 is connected to the access node 410, and is configured to provide for addition, deletion, modification, and lookup on the feature library, as well as retrieval operations based on the feature library. In the embodiments of this application, the retrieval is used to instruct to calculate similarities between a feature vector of an object and intra-library feature matrices in the feature library using a parallel computing capability of a processor, and then arrange hit features in descending order of similarity in retrieval results. In a possible implementation, 128 features with the highest similarities may be displayed as the retrieval results. The quantity of the displayed retrieval results may be adjusted, which is not limited in the embodiments of this application.

The monitoring service node 440 is connected to the retrieval node 430, and the monitoring service node 440 is configured to monitor the state of the retrieval node 430. The state of the retrieval node 430 includes an online state and an offline state. When the retrieval node 430 is in the offline state, the retrieval node 430 has a downtime (also referred to as a failure). In an application mode, when there is no master retrieval node in the retrieval nodes belonging to a same retrieval node identifier, the monitoring service node 440 conducts a procedure of electing a master retrieval node. For example, when a retrieval node group 431 in the retrieval node 430 includes a retrieval node 431a and a retrieval node 431b. Retrieval node identifiers corresponding to the retrieval node 431a and the retrieval node 431b are both 431. In this case, the monitoring service node 440 determines one master retrieval node in the retrieval node 431a and the retrieval node 431b, and the remaining retrieval node is a slave retrieval node. For example, if the retrieval node 431a is determined as the master retrieval node, then the retrieval node 431b is the corresponding slave retrieval node.

The monitoring service node 440 may be deployed with a plurality of instances. The monitoring service node 440 may further include a master monitoring service node 441 and a slave monitoring service node 442. For the master election procedure in the monitoring service node 440, a process of electing a master monitoring service node may be implemented using an Etcd distributed lock.

The configuration center 450 is connected to the monitoring service node 440 and configured to obtain a master retrieval node information list reported by the monitoring service node 440. The master retrieval node information list is used for recording information about all master retrieval nodes in this privatized distributed feature library system. In a possible implementation, the information about the master retrieval node includes a node identifier (English: node_id), a node type (English: node_type), a node storage capacity (English: node_cap), and feature library information. The feature library information includes a feature library identifier (English: lib_id), a feature library storage capacity (English: lib_cap), and a feature library cache amount (English: lib_size).

Optionally, the retrieval node 430 provided in the embodiments of this application supports related similarity measures. In a possible implementation, the similarity measures can include a retrieval type, a feature dimension, a feature type, and a calculation method. (1) The retrieval type may include CPU-scheduling retrieval and GPU-scheduling retrieval. (2) The feature dimension may be data such as 256, 512, 768, 1024, and 1536. (3) The feature type may be INT7, INT8, or FP32. (4) The calculation method may include a cosine distance and a Euclidean distance.

Table 1 shows content of a similarity measure provided in the embodiments of this application.

TABLE I

| Feature library retrieval | | | |
|---|---|---|---|
| Retrieval type | Feature dimension | Feature type | Calculation method |
| CPU/GPU | 256/512/768/ 1024/1536 | INT7/ INT8/FP32 | Cosine distance/Euclidean distance |

In the architecture of the privatized distributed feature library system shown in FIG. 4, the database 460 is directly connected to the access node 410 to provide a database service for the entire system.

In the solutions shown in the embodiments of this application, the architecture of the privatized distributed feature library system may be referred to as a database-based solution.

Figure 5:
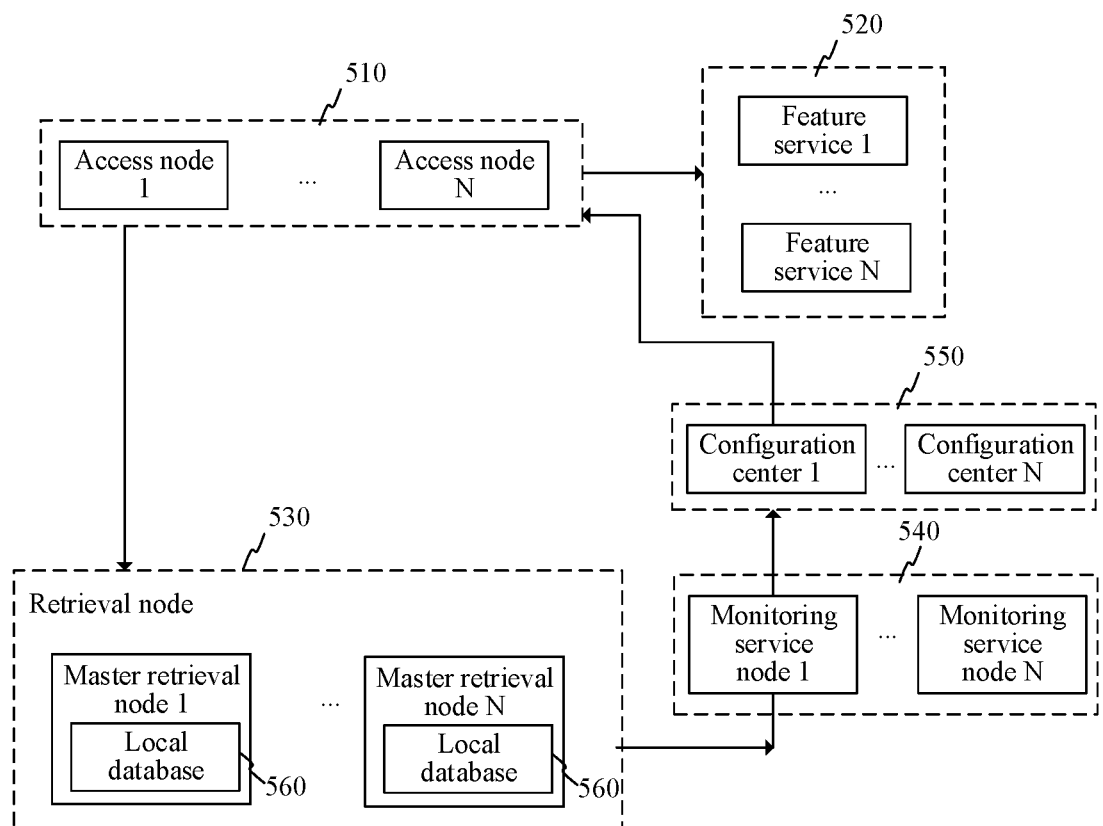
FIG. 5 is a framework diagram of another privatized distributed feature library system according to an embodiment of this application.

In another possible implementation, the database of the privatized distributed feature library system may alternatively be a distributed database. A database is deployed on each retrieval node locally. FIG. 5 is a framework diagram of a privatized distributed feature library system according to an embodiment of this application.

In FIG. 5, the privatized distributed feature library system includes an access node 510, a feature service node 520, a retrieval node 530, a monitoring service node 540, a configuration center 550, and a database 560. Different from the system in the architecture of the privatized distributed feature library system shown in FIG. 4, in the architecture shown in FIG. 5, the database is configured as a distributed database. Each retrieval node includes a locally deployed database. In a possible implementation, the database may be a LevelDB.

In the embodiment shown in FIG. 5, for related functions and configurations of the access node 510, the feature service node 520, the retrieval node 530, the monitoring service node 540, and the configuration center 550, reference may be made to the descriptions of the access node 410, the feature service node 420, the retrieval node 430, the monitoring service node 440, and the configuration center 450, and details are not described herein again.

In a possible implementation, the architecture of the privatized distributed feature library system shown in FIG. 5 may be referred to as a file-based solution.

Based on the foregoing description, the privatized distributed feature library system shown in this application may be deployed according to the architecture shown in FIG. 4, or may be deployed according to the architecture shown in FIG. 5. Based on the above, a routing policy, an active-standby synchronization procedure, a cache management mode, and a feature retrieval procedure of the privatized distributed feature library system are described below.

The routing policy of the privatized distributed feature library system will be described below using the embodiment shown in FIG. 6.

Figure 6:
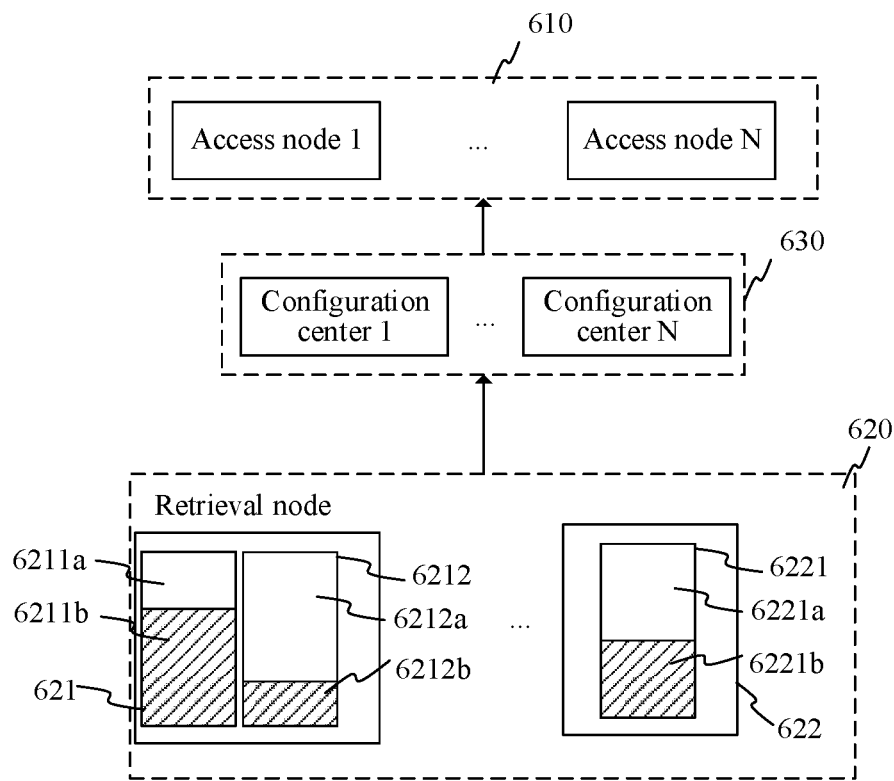
FIG. 6 is a schematic diagram of a routing policy of a privatized distributed feature library system according to an embodiment of this application.

FIG. 6 is a schematic diagram of a routing policy of a privatized distributed feature library system according to an embodiment of this application. In FIG. 6, the privatized distributed feature library system includes an access node 610, a retrieval node 620, and a configuration center 630. The retrieval node 620 includes a retrieval node 621 and a retrieval node 622. The retrieval node 621 includes a video memory block 6211 storing data of a first feature library and a video memory block 6212 storing data of a third feature library. The video memory block 6211 includes a cache space 6211a and a feature library 6211b. The video memory block 6212 includes a cache space 6212a and a feature library 6212b. The retrieval node 622 includes a video memory block 6221 storing data of a third feature library. The video memory block 6221 includes a cache space 6221a and a feature library 6221b.

In the system shown in FIG. 6, a picture feature retrieval service may be provided for the outside. In this system, a feature library needs to be pre-built. Pictures can be imported from the outside of the system in batches. In a possible implementation, a quantity of pictures may be massive. The access node calls a corresponding feature service to extract object features of objects from pictures. The system can cache the object features to caches of corresponding nodes by using a specific routing policy, so as to build a distributed feature library.

In the embodiments of this application, a terminal scans, from front to back according to the principle of sequential allocation, a master retrieval node information list reported by the configuration center. For the master retrieval node information list, reference may be made to the related content in FIG. 4, and details are not described herein again.

In the embodiments of this application, the privatized distributed feature library system may store features to the retrieval nodes according to the following rules.

Rule (1): When a cache space of a current retrieval node is not full, allocate features to the retrieval node, to store the new features.

Rule (2): When a cache space of a current retrieval node is full, but a feature library of the current retrieval node is not full, allocate features to the retrieval node, to store the new features.

Rule (3): When a cache space of a current retrieval node is full, and a feature library of the current retrieval node is full, determine whether features can be written into a retrieval node next to the current retrieval node in the master retrieval node information list.

The active-standby synchronization procedure of the privatized distributed feature library system will be described below using the embodiment shown in FIG. 7.

Figure 7:
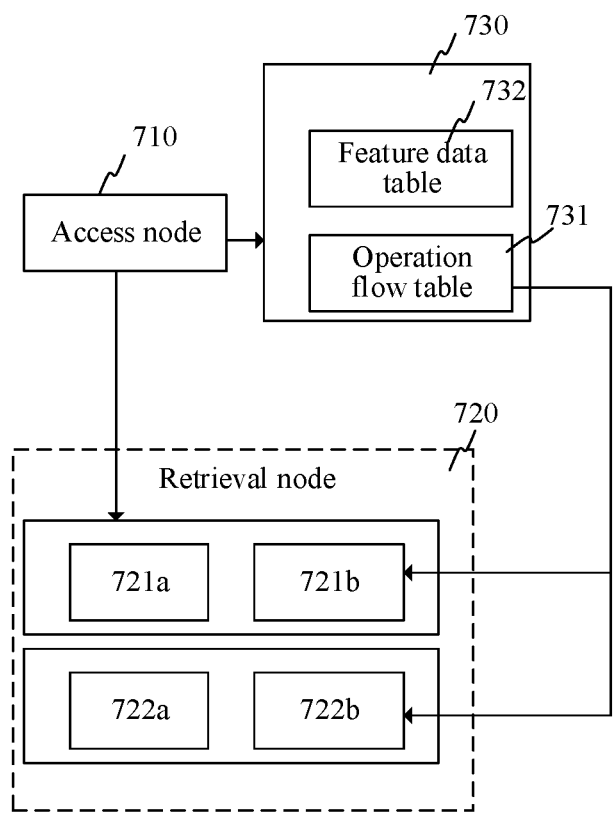
FIG. 7 is a diagram of an implementation environment an active-standby synchronization procedure of a privatized distributed feature library system according to an embodiment of this application.

FIG. 7 is a diagram of an implementation environment an active-standby synchronization procedure of a privatized distributed feature library system according to an embodiment of this application. An access node 710, a retrieval node 720, and a database 730 are included in FIG. 7. The retrieval node 720 includes a master retrieval node 721 and a slave retrieval node 722.

The master retrieval node 721 includes a video memory pool 721a and a synchronization thread 721b.

The slave retrieval node 722 includes a video memory pool 722a and a synchronization thread 722b.

For example, in the privatized distributed feature library system, all service modules are deployed with a plurality of instances. Therefore, the privatized distributed feature library system can guarantee the availability of the service modules through active redundancy or passive redundancy. Both the master retrieval node 721 and the slave retrieval node 722 are stateful retrieval node, and caches in the retrieval nodes have important feature data. Therefore, the embodiments of this application provide an active-standby synchronization method, to improve the consistency of data between the master retrieval node and the slave retrieval node.

In the embodiments of this application, an operation flow table 731 and a feature data table 732 may be created in the database 730. The operation flow table 731 is used for recording addition, deletion, modification, and lookup operations on the feature library. When massive pictures are imported from the outside of the system to establish a feature library, the system writes features into the database 730 in a write-through mode.

Addition, deletion, modification, and lookup operations on feature data in the feature library are imported by the access node into the system, for performing related operations on feature data in the database first. The operation flow table 731 stores flow records of operations. The feature data table 732 stores feature data.

In the embodiments of this application, the access node 710 in this privatized distributed feature library system can write feature data into the cache space of the master retrieval node 721 using the routing policy, and guarantee consistency between feature data in database 730 and feature data in the cache space of master retrieval node 721.

Subsequently, the slave retrieval node 722 pull a serialization operation flow from the database 730 through the synchronization thread 722b, and the serialization operation flow is all or part of the data in the operation flow table 731. In a possible implementation, the serialization operation flow corresponds to an operation of storing feature data into the cache space of the master retrieval node 721. The slave retrieval node 722 can obtain the feature data according to the serialization operation flow. Therefore, after the slave retrieval node 722 pulls the serialization operation flow from the database 730 through the synchronization thread 722b, the consistency of data is achieved between the slave retrieval node 722 and the master retrieval node 721.

The cache management mode of the privatized distributed feature library system will be described below using the embodiment shown in FIG. 8.

Figure 8:
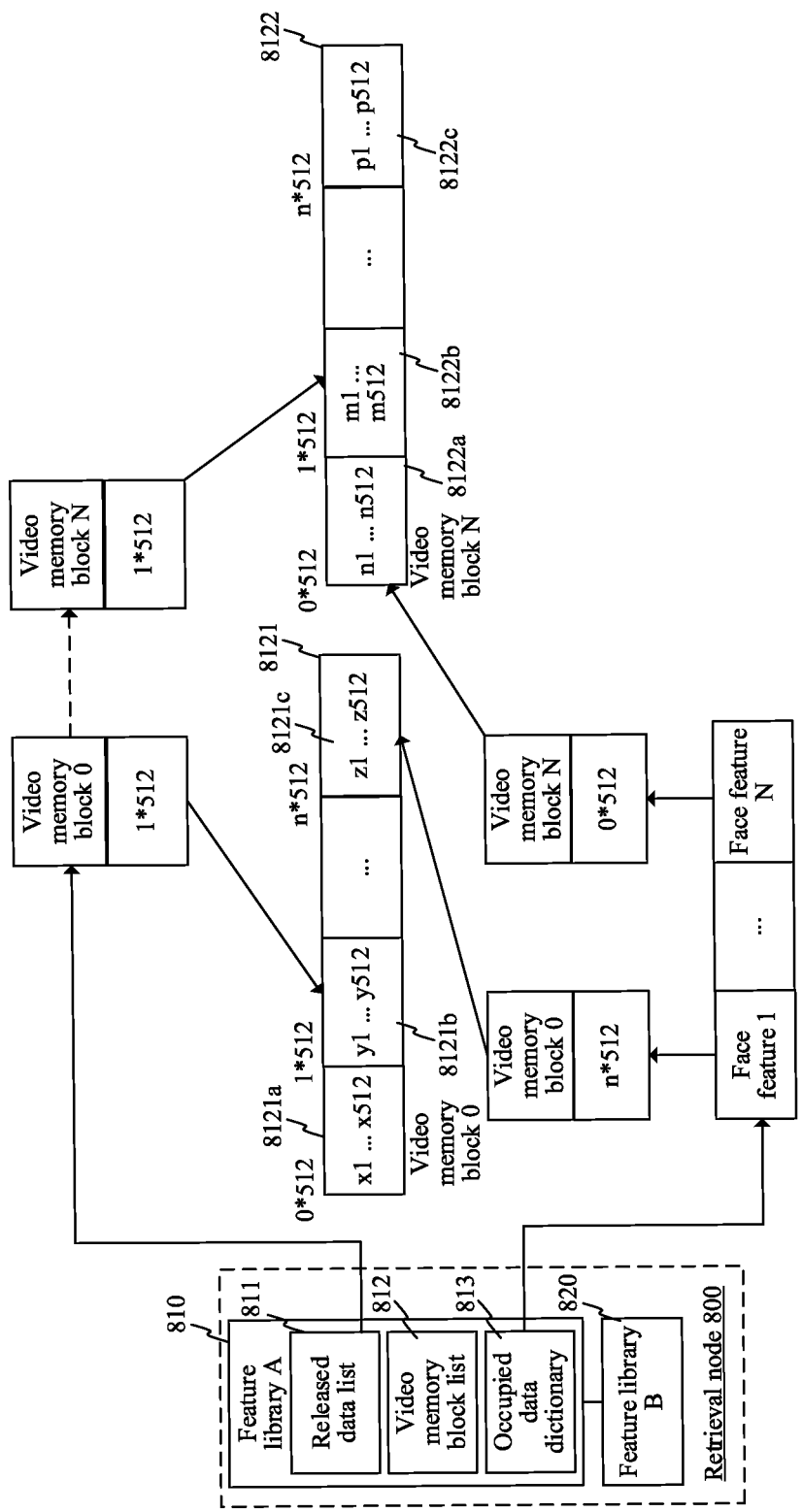
FIG. 8 is a schematic diagram of a cache management mode of a privatized distributed feature library system according to an embodiment of this application.

FIG. 8 is a schematic diagram of a cache management mode of a privatized distributed feature library system according to an embodiment of this application. In FIG. 8, a retrieval node 800 is included. The retrieval node 800 includes a feature library 810 and a feature library 820. The feature library 810 includes a released data list 811, a video memory block list 812, and an occupied data dictionary 813.

The video memory block list 812 shown in FIG. 8 includes a video memory block 8121 and a video memory block 8122. The video memory block 8121 includes a first storage unit 8121a, a second storage unit 8121b, and a third storage unit 8121c. The video memory block 8122 includes a fourth storage unit 8122a, a fifth storage unit 8122b, and a sixth storage unit 8122c.

In a possible implementation, feature data in this application is cached in a blockchain manner according to the video memory blocks configured in the video memory block list 812. In this design, if data in one video memory block has continuity, for feature data in the video memory block, the parallel computing capability of the processor can be fully utilized. Therefore, continuous distribution of the feature data in the video memory block can be guaranteed, and data outside the video memory block can grow dynamically without affecting the data in the video memory block.

The released data list 811 in FIG. 8 records k released data storage addresses. A data storage address of a released data block 8111 is the second storage unit 8121b, and a data storage address of a released data block 8112 is the fourth storage unit 8122a.

The occupied data dictionary 813 in FIG. 8 records q occupied data storage addresses. A data storage address of an occupied data block is the third storage unit 8121c, and a data storage address of an occupied data block is the fifth storage unit 8122b.

Optionally, corresponding functions of the retrieval nodes in this application are described using an example in which addition, deletion, and modification operations are performed on the feature library.

(1) When an operation of deleting a feature is performed on the feature library, video memory information occupied by the feature is stored into the released data list 811, and content of the video memory information is zeroed. For example, the second storage unit 8121b originally stores a feature. After the feature is deleted, data bits in the second storage unit 8121b are all zeroed, and video memory information of the second storage unit 8121b is stored into the released data list 811.

(2) When an update or feature query operation is performed on feature library, the retrieval node can directly use the occupied data dictionary 813, and determine a to-be-updated or to-be-queried feature using the occupied data dictionary 813.

(3) When a feature insertion is performed on the feature library, the retrieval node can reuse a data storage address indicated in the released data list 811. Based on the above, if storage units in the video memory block indicated in the released data list 811 are full of features, the retrieval unit is instructed to determine whether there is a video memory block with an idle storage unit. Based on the above, if the used video memory block is full of features, a new video memory block is applied for from the retrieval node is.

The feature retrieval procedure of the privatized distributed feature library system will be described below using FIG. 9.

Figure 9:
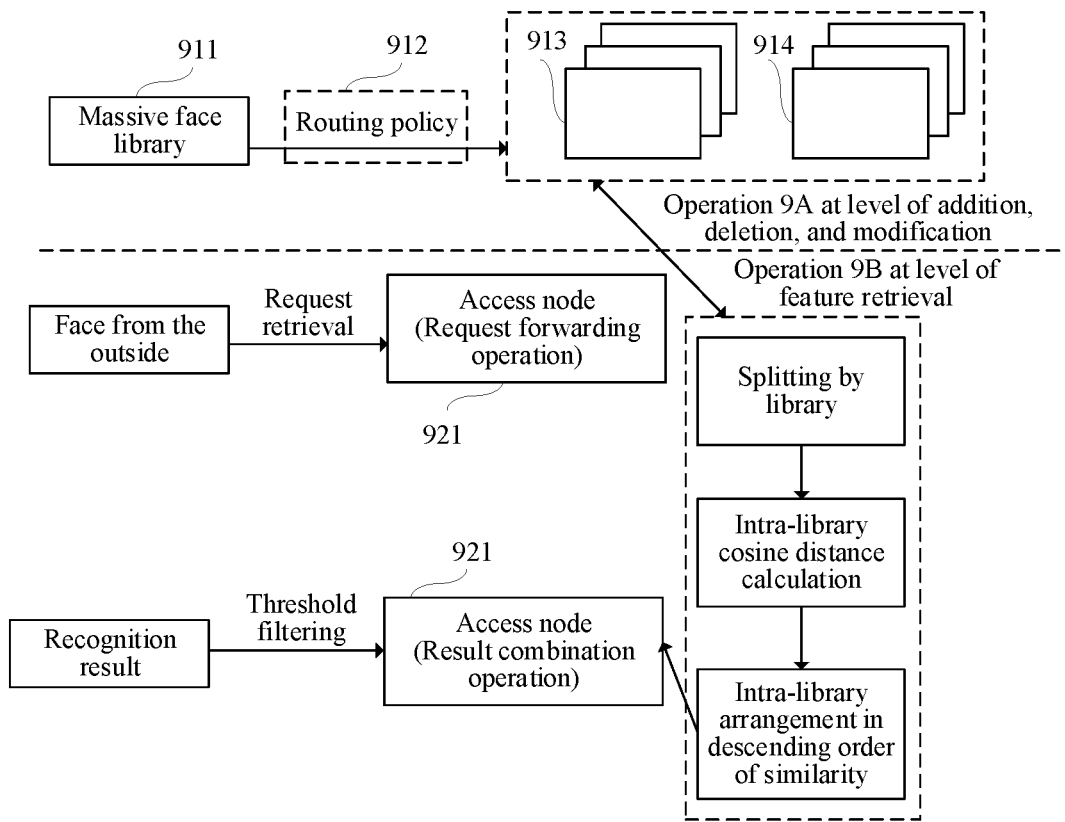
FIG. 9 is a schematic diagram of a feature retrieval procedure of a privatized distributed feature library system according to an embodiment of this application.

FIG. 9 is a schematic diagram of a feature retrieval procedure of a privatized distributed feature library system according to an embodiment of this application. In FIG. 9, an operation 9A at a level of addition, deletion, and modification and an operation 9B at a feature detection level are included.

In the operation 9A at the level of addition, deletion, and modification, under the action of a routing policy 912, a feature service node of a massive face library 911 is called by an access node to extract features and cache the features into retrieval nodes, to form a retrieval node 913 and a retrieval node 914.

The retrieval node 913 includes feature data in a first base library, a second base library, and a third base library, and the retrieval node 914 includes feature data in a second base library, a third base library, and a fourth base library. Data of the second base library stored in the retrieval node 913 is different from data of the second base library stored in the retrieval node 914. For example, the second base libraries includes 100,000 features. The second base library of the retrieval node 913 stores the first 50,000 features, and the second base library of the retrieval node 914 stores the last 50,000 features.

In the operation 9B at the feature detection level, the access node 921 receives an image retrieval request including a face from the outside. The access node 921 forwards the retrieval request to the retrieval node, and the retrieval node may split the retrieval request according to base libraries to which the request is directed. For example, if the retrieval request is requested for the second base library, the access node forwards the retrieval request to the retrieval node 913 and the retrieval node 914 respectively, and obtains features of the second base libraries in the retrieval node 913 and the retrieval node 914 respectively. Subsequently, the retrieval node 913 or the retrieval node 914 combines the features in the second base libraries to form an intra-library feature matrix. The retrieval node calculates similarities between the intra-library feature matrix and a face feature vector. For the calculation process, refer to the procedure 10A in FIG. 10. For the calculation method, refer to the method shown in Table in the embodiments of this application. Subsequently, the retrieval node may output the first 100 features most similar to the face feature vector from the base library. For example, the 100 features may be arranged in descending order of similarity for display.

Optionally, the access node may alternatively obtain retrieval results from other base libraries, and combine the retrieval results in the base libraries. The access node may further set a similarity threshold, and intercept features with similarities higher than the similarity threshold as final recognition results, and then the access node outputs the recognition results.

Figure 10:
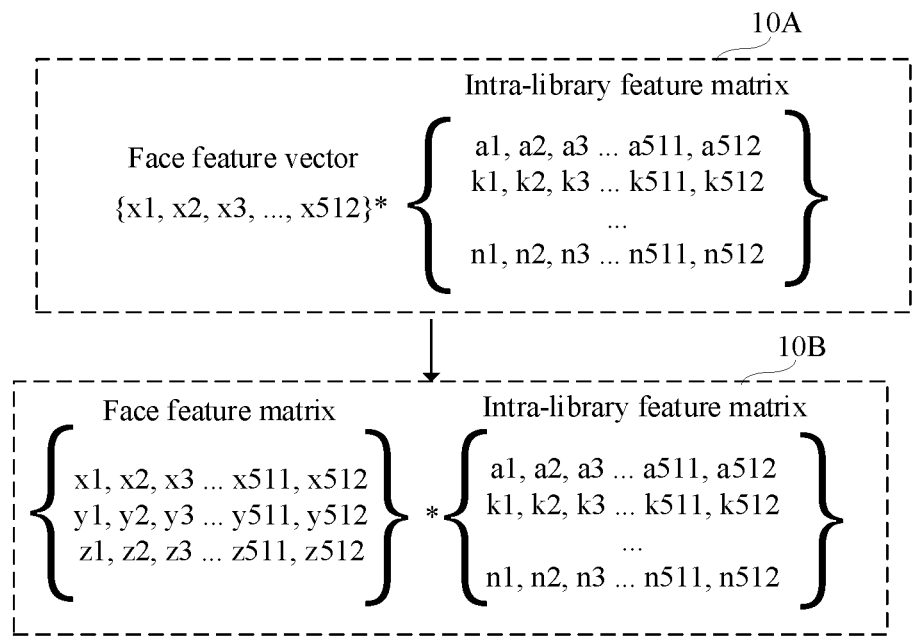
FIG. 10 is a schematic diagram of retrieval request combination provided based on the embodiment shown in FIG. 9.

In a possible implementation, the terminal may further combine a plurality of retrieval requests through batch acceleration. FIG. 10 is a schematic diagram of retrieval request combination provided based on the embodiment shown in FIG. 9. In FIG. 10, in a procedure 10A, a similarity calculation is performed between a first face feature vector and intra-library feature matrices. In a procedure 10B, a similarity calculation is performed between the first face feature vector, a second face feature vector, and a third face feature vector and the feature matrix intra-library feature matrices. The embodiments of this application provide a retrieval request combination method, which can effectively improve the retrieval efficiency when a quantity of intra-library feature matrices is huge.

The privatized distributed feature library system disclosed in the embodiments of this application disclose can be applied to retrieval of various objects. For example, the objects may include a face, a vehicle, and a human body. For example, the embodiments of this application can support a super large library scenario and a financial industry scenario.

In an implementation, the super large library scenario may include hundreds of millions of feature libraries. The privatized distributed feature library system used in this scenario may be the file-based distributed retrieval solution provided in this application.

In another implementation, the financial industry scenario requires that services have high availability. Data can be stored and encrypted in a centralized manner. A database-based distributed retrieval solution provided in this application can be used.

The retrieval node in the embodiments of this application store features using a blockchain storage structure. Therefore, the video memory block in the retrieval node can adjust the size of the video memory block adaptively according to the size of the feature library to balance performance and cache attributes.

In an application scenario, if the privatized distributed feature library system is applied to a small library scenario, the privatized distributed feature library system reduces the size of the video memory block under the allowance the retrieval feedback duration, thereby reducing cache costs and increasing the retrieval time consumption in exchange for the effect of reducing the occupied cache space.

For example, in a case that the size of one video memory block is 100 MB, and a feature size is 101 MB, the feature occupies two video memory blocks of the privatized distributed feature library system, that is, occupy a 200 MB cache capacity. In a case that the size of one cache block is 10 MB, the feature occupies 11 video memory blocks of the privatized distributed feature library system, that is, occupy a 110 MB cache capacity. The occupied cache space of the latter is less than that of the former. In addition, because the data continuity of the former is better, in the small library scenario, this application reduces the occupied cache space while consuming a sufficiently short time.

In another application scenario, if the privatized distributed feature library system application is applied to a large library scenario, the privatized distributed feature library system increases the size of the video memory block under the allowance of the cache space, thereby improving the data continuity of the feature library, and allows the feature retrieval to obtain retrieval results within a relatively short time.

Figure 11:
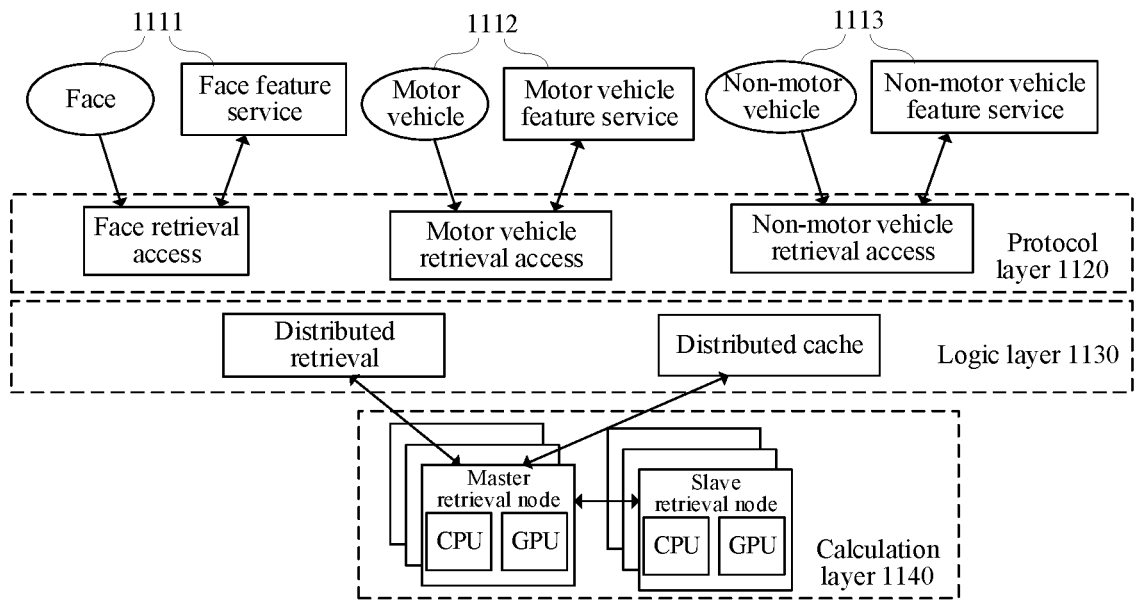
FIG. 11 is a diagram of a scenario supported by a privatized distributed feature library system according to an embodiment of this application.

FIG. 11 is a diagram of a scenario supported by a privatized distributed feature library system according to an embodiment of this application. In FIG. 11, the applied scenario includes a face feature retrieval scenario 1111, a motor vehicle feature retrieval scenario 1112, and a non-motor vehicle feature retrieval 1113. In FIG. 11, a protocol layer 1120, a logic layer 1130, and a calculation layer 1140 are further included.

Figure 12:
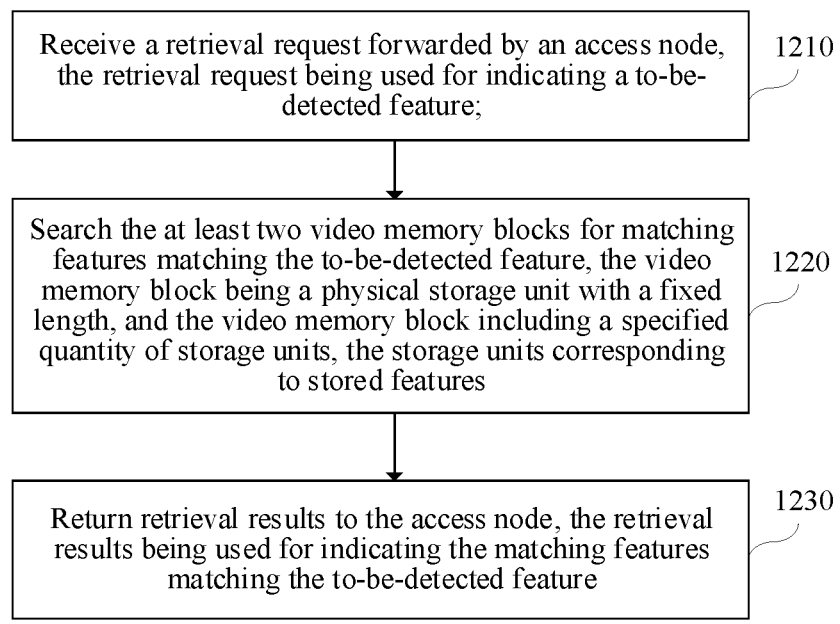
FIG. 12 is a flowchart of a distributed retrieval method according to an exemplary embodiment of this application.

FIG. 12 is a flowchart of a distributed retrieval method according to an exemplary embodiment of this application. The distributed retrieval method may be applied to the retrieval node shown above. The retrieval node includes at least two video memory blocks. Cache spaces are allocated between the at least two video memory blocks using a blockchain structure. In FIG. 12, the distributed retrieval method includes the following steps:

Step 1210: Receive a retrieval request forwarded by an access node, the retrieval request being used for indicating a to-be-detected feature.

In this embodiment of this application, the retrieval node can receive a retrieval request forwarded by the access node.

Step 1220: Search the at least two video memory blocks for features matching the to-be-detected feature, the video memory block being a physical storage unit with a fixed length, and the video memory block including a specified quantity of storage units, the storage units corresponding to stored features.

In a possible implementation, the retrieval node retrieve features matching the to-be-detected feature in the retrieval request in features cached by the retrieval node. The retrieval node may include a plurality of video memory blocks.

For example, to avoid the barrel effect, in this embodiment of this application, sizes of the video memory blocks may be set to a same size. The video memory block includes a specified quantity of storage units. Optionally, one storage unit is configured to store one stored feature.

Step 1230: Return retrieval results to the access node, the retrieval results being used for indicating the matching features matching the to-be-detected feature.

For example, the retrieval node may return retrieval results to the access node. The retrieval results indicates the matching features matching the to-be-detected feature. The features are features cached in the retrieval node.

In this embodiment of this application, for a process in which the retrieval node performs the distributed retrieval method, reference may be made to the related operations performed in the foregoing embodiments of this application, and details are not described herein again.

In conclusion, in the distributed retrieval method provided in this embodiment of this application, in this embodiment of this application, a retrieval request forwarded by an access node can be received, video memory blocks are searched for matching features matching a to-be-detected feature, the video memory block being a physical storage unit with a fixed length, and the video memory block including a specified quantity of storage units, the storage units corresponding to stored features, and retrieval results are returned to the access node, the retrieval results being used for indicating the matching features matching the to-be-detected feature. Because the video memory block in this embodiment of this application includes storage units with a fixed length, features can be continuously stored in the video memory block, and storage spaces are allocated between a plurality of video memory blocks in the retrieval node using a blockchain structure, thereby overcoming the problem of data discretization brought about by a storage hole caused by deletion in the related art.

Figure 13:
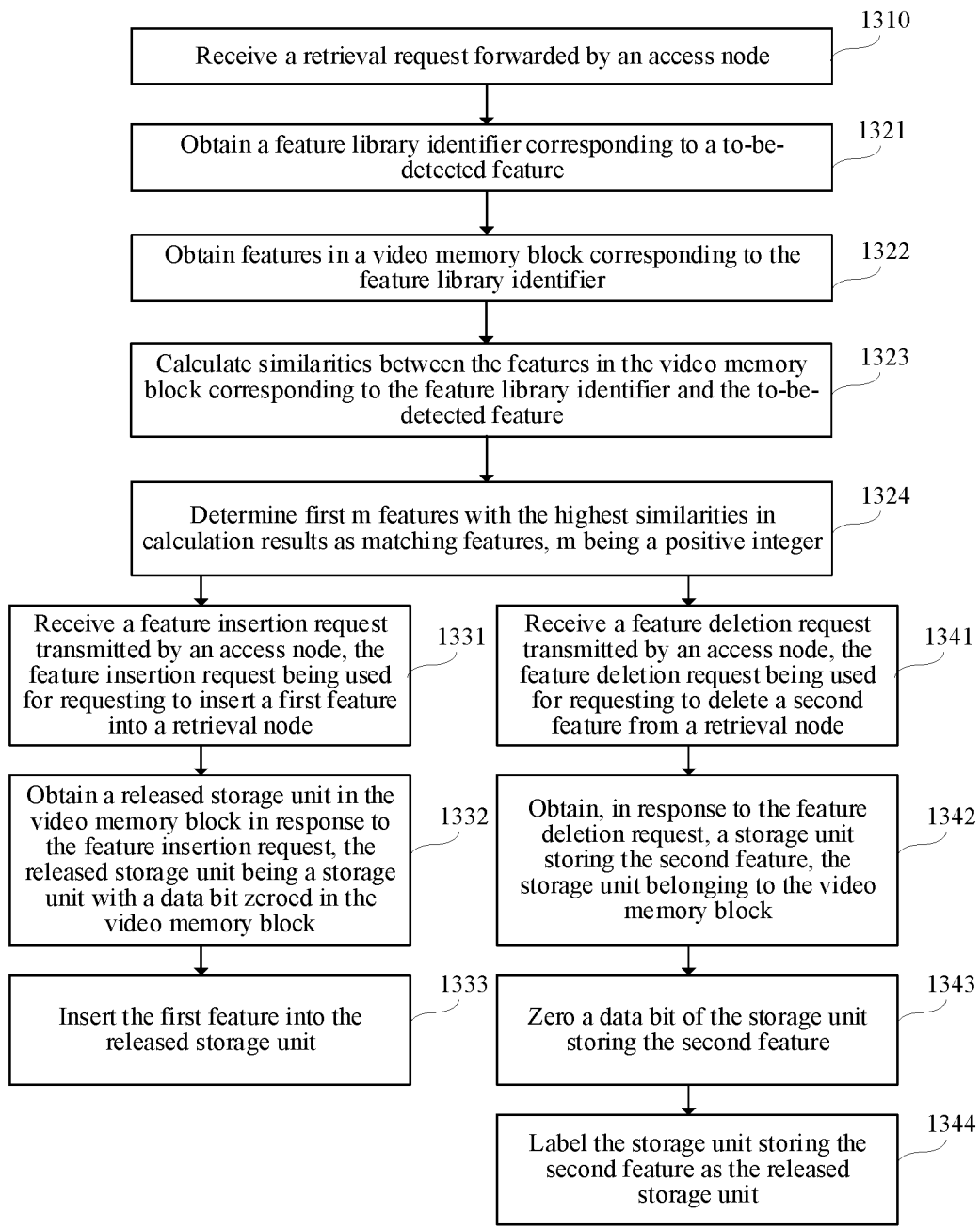
FIG. 13 is a flowchart of a distributed retrieval method according to another exemplary embodiment of this application.

FIG. 13 is a flowchart of a distributed retrieval method according to another exemplary embodiment of this application. The distributed retrieval method may be applied to the retrieval node shown above. The retrieval node includes at least two video memory blocks. Cache spaces are allocated between the at least two video memory blocks using a blockchain structure. In FIG. 13, the distributed retrieval method includes the following steps:

Step 1310: Receive a retrieval request forwarded by an access node.

The execution process of step 1310 is the same as that of step 1210, and details are not described herein again.

Step 1321: Obtain a feature library identifier corresponding to the to-be-detected feature.

Step 1322: Obtain features in a video memory block corresponding to the feature library identifier.

Step 1323: Calculate similarities between the features in the video memory block corresponding to the feature library identifier and the to-be-detected feature.

In a possible alternative implementation, the retrieval node may calculate Euclidean distances between the features in the video memory block corresponding to the feature library identifier and the to-be-detected feature.

Alternatively, the retrieval node may calculate cosine distances between the features in the video memory block corresponding to the feature library identifier and the to-be-detected feature.

Step 1324: Determine first m features with the highest similarities in calculation results as the matching features, m being a positive integer.

Step 1331: Receive a feature insertion request transmitted by the access node, the feature insertion request being used for requesting to insert a first feature into the retrieval node.

Step 1332: Obtain a released storage unit in the video memory block in response to the feature insertion request, the released storage unit being a storage unit with a data bit zeroed in the video memory block.

Step 1333: Insert the first feature into the released storage unit.

Step 1341: Receive a feature deletion request transmitted by the access node, the feature deletion request being used for requesting to delete a second feature from the retrieval node.

Step 1342: Obtain, in response to the feature deletion request, a storage unit storing the second feature, the storage unit belonging to the video memory block.

Step 1343: Zero a data bit of the storage unit storing the second feature.

Step 1344: Label the storage unit storing the second feature as the released storage unit.

In this embodiment of this application, for a process in which the retrieval node performs the distributed retrieval method, reference may be made to the related operations performed in the foregoing embodiments of this application, and details are not described herein again.

In conclusion, in the distributed retrieval method provided in this embodiment of this application, a feature insertion request transmitted by the access node can be received, the feature insertion request being used for requesting to insert a first feature into the retrieval node, a released storage unit in the video memory block can be obtained in response to the feature insertion request, the released storage unit being a storage unit with a data bit zeroed in the video memory block, and the first feature can be inserted into the released storage unit, so that the retrieval node can reuse the storage unit, and does not need to adjust storage locations of features that have been stored when a feature is deleted from the retrieval node, thereby reducing the migration problem and the avalanche effect of the distributed feature library and improving the storage performance of the feature library.

In the distributed retrieval method provided in this embodiment, further, a feature deletion request transmitted by the access node can be received, the feature deletion request being used for requesting to delete a second feature from the retrieval node; a storage unit storing the second feature can be obtained in response to the feature deletion request, the storage unit belonging to the video memory block; a data bit of the storage unit storing the second feature can be zeroed; and the storage unit storing the second feature can be labeled as the released storage unit. Because the retrieval node labels a storage unit occupied by a deleted node instead of releasing the storage unit, the effect of reusing the storage unit during subsequent feature insertion is improved, and the storage performance of the feature library is improved.

Figure 14:
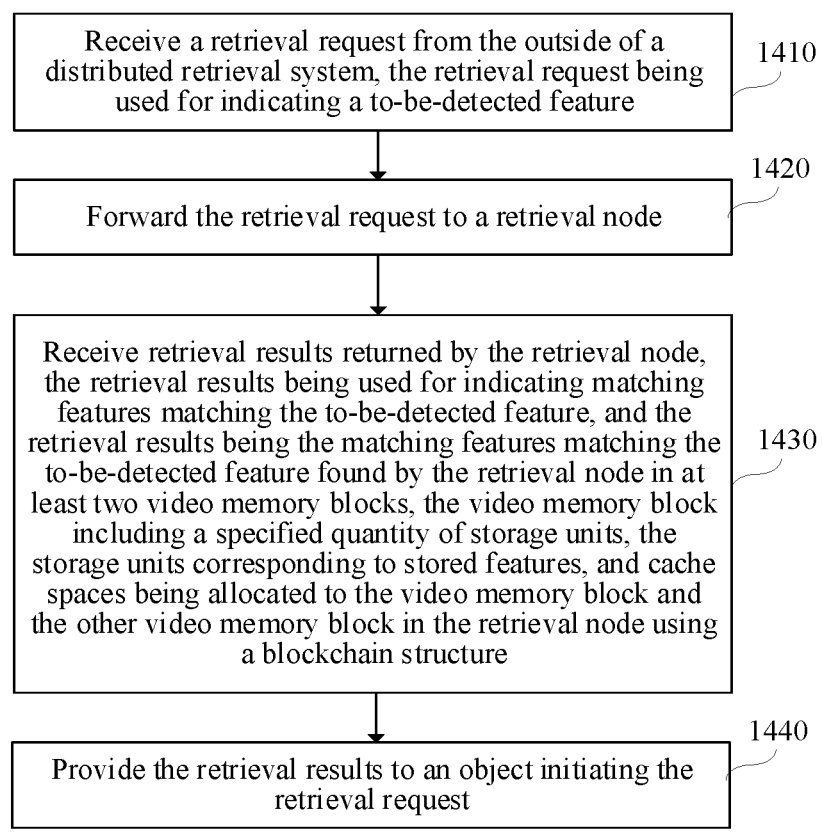
FIG. 14 is a flowchart of a distributed retrieval method according to another exemplary embodiment of this application.

FIG. 14 is a flowchart of a distributed retrieval method according to another exemplary embodiment of this application. The distributed retrieval method may be applied to the access node shown above. In FIG. 14, the distributed retrieval method includes the following steps:

Step 1410: Receive a retrieval request from the outside of a distributed retrieval system, the retrieval request being used for indicating a to-be-detected feature.

In this application, the access node, as a node in the distributed retrieval system that interacts with the outside, can receive a retrieval request from outside the system. The retrieval request is used for detecting matching features matching the to-be-detected feature. In a possible implementation, information appended to the retrieval request includes the to-be-detected feature. In another possible implementation, information appended to the retrieval request includes a to-be-detected picture. The access node may extract a feature from the to-be-detected picture using a feature service, and append the features of the to-be-detected picture to the retrieval request.

Step 1420: Forward the retrieval request to a retrieval node.

In this embodiment of this application, the access node can forward the retrieval request to the retrieval node. Because the retrieval node is a plurality of nodes in the distributed retrieval system, the access node may select a specified retrieval node for retrieval according to a range specified by the retrieval request. In another possible implementation, when no range is specified in the retrieval request, the access node may forward the retrieval request to all retrieval nodes in the distributed retrieval system.

Step 1430: Receive retrieval results returned by the retrieval node, the retrieval results being used for indicating matching features matching the to-be-detected feature, and the retrieval results being the matching features matching the to-be-detected feature found by the retrieval node in at least two video memory blocks, the video memory block including a specified quantity of storage units, the storage units corresponding to stored features, and cache spaces being allocated to the video memory block and the other video memory block in the retrieval node using a blockchain structure.

For example, the distributed retrieval system collects retrieval results returned by the retrieval nodes. The retrieval results are used indicating matching features matching the to-be-detected feature found in the video memory block. The video memory block includes a specified quantity of storage units. The storage units correspond to stored features.

Because storage spaces are allocated between a plurality of video memory blocks in the retrieval node using a blockchain structure, a single retrieval node can avoid the problem the data hole and data reorganization problems caused by another storage space allocation method. In the entire distributed retrieval system, the security of the features and the continuity of the features are both improved, thereby improving the efficiency of retrieving features using the system retrieval.

Step 1440: Provide the retrieval results to an object initiating the retrieval request.

For example, after receiving the retrieval results returned by the retrieval node, the access node may further provide the retrieval results to the object initiating the retrieval request. In a possible implementation, when the retrieval speed is relatively high, the access node also provides the retrieval results to the object the object initiating the retrieval request at a relatively high speed. The retrieval efficiency of the entire distributed retrieval system may affect the efficiency of obtaining the retrieval results by the object initiating the retrieval request.

In conclusion, in the distributed retrieval method provided in this embodiment of this application, the access node can receive a retrieval request from the outside of a distributed retrieval system, forward the retrieval request to a retrieval node, receive retrieval results returned by the retrieval node, the retrieval results being used for indicating matching features matching the to-be-detected feature, and the retrieval results being the matching features matching the to-be-detected feature found by the retrieval node in at least two video memory blocks, the video memory block including a specified quantity of storage units, the storage units corresponding to stored features, and provide the retrieval results to an object initiating the retrieval request. Because the retrieval results are results obtained by performing matching on the features stored in the video memory blocks, when the features distributed in the storage units in the video memory blocks can be added, deleted, or modified efficiently, the continuity of the features during storage is improved, and the large feature library lookup is accelerated.

Figure 15:
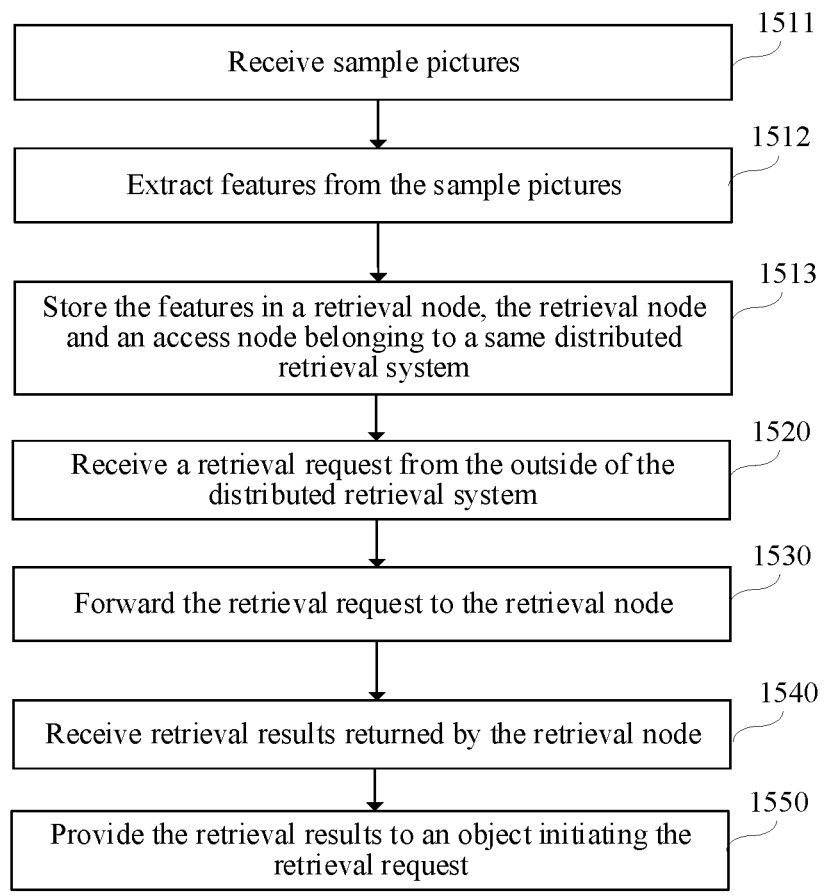
FIG. 15 is a flowchart of a distributed retrieval method according to an exemplary embodiment of this application.

FIG. 15 is a flowchart of a distributed retrieval method according to an exemplary embodiment of this application. The method is applicable to an access node. The method may include the following steps:

Step 1511: Receive sample pictures.

For example, the access node can receive sample pictures in a phase of building a feature library. The sample pictures are used for providing features. During subsequent picture retrieval, the features of the sample pictures are used for matching with a to-be-detected feature. In view of the above, a possible objective of receiving sample pictures is to build a feature library.

Step 1512: Extract features from the sample pictures.

For example, the access node may call a feature service in the distributed retrieval system to extract features from the sample picture.

Step 1513: Store the features in a retrieval node, the retrieval node and the access node belonging to a same distributed retrieval system.

Optionally, the access node can store the features in the retrieval node, the retrieval node and the access node belonging to a same distributed retrieval system. Because the distributed retrieval system includes a plurality of retrieval nodes, the access node can allocate the features to the retrieval nodes according to specific rules.

For example, the access node may alternatively store the features into the retrieval node by performing step (1), step (2), step (3), and step (4).

Step (1): Receive a feature cache request, the feature cache request being used for storing the corresponding features into the retrieval node in the distributed retrieval system.

For example, the feature cache request may be a request activated after the access node completes extracting the features from the sample pictures. The feature cache request may alternatively be a request received by the access node from the outside of the distributed retrieval system.

Step (2): Obtain a cache space remaining amount and a feature library remaining amount of a first retrieval node in response to the feature cache request.

For example, in a possible scenario, the access node obtains a cache space remaining amount and a feature library remaining amount of a first retrieval node in response to the feature cache request. The cache space is used for temporarily storing features, and the feature library is used for storing features for a long term.

Step (3): Allocate the features corresponding to the feature cache request to the first retrieval node in response to that the cache space remaining amount is greater than zero or the feature library remaining amount is greater than zero.

For example, when the cache space remaining amount is greater than zero, it indicates that the first retrieval node has a cache space for storing features, and can continue to store the features. In another possible implementation, when the feature library remaining amount is greater than zero, it indicates that the first retrieval node has a space for long-term storage of features, and the first retrieval node can still continue to store features.

Therefore, regardless that the cache space remaining amount is greater than zero or the feature library remaining amount is greater than zero, there is still a storage space that can be used for storing features in the retrieval node. In this case, the access node can continue to allocate features corresponding to the feature cache request to the first retrieval node.

Step (4): Allocate the features corresponding to the feature cache request to a second retrieval node in response to that the cache space remaining amount is equal to zero and the feature library remaining amount is equal to zero, the second retrieval node and the first retrieval node belonging to the same distributed retrieval system.

For example, in response to that the cache space remaining amount is equal to zero and the feature library remaining amount is equal to zero, the access node may determine that both storage spaces in the first retrieval node have been exhausted. In this case, the access node may allocate the features to another retrieval node. For example, the access node allocate the features to a second retrieval node, so that the features can be continuously stored in the same retrieval node, thereby ensuring that the features can be continuously matched during retrieval, and improving the retrieval efficiency.

Step 1520: Receive a retrieval request from the outside of the distributed retrieval system.

Step 1530: Forward the retrieval request to the retrieval node.

Step 1540: Receive retrieval results returned by the retrieval node.

Step 1550: Provide the retrieval results to an object initiating the retrieval request.

For example, for the execution methods of step 1520 to step 1550, reference may be made to the execution methods of step 1410 to step 1440, and details are not described herein again.

In conclusion, the distributed retrieval method provided in this embodiment of this application can enable the access node to allocate features according to the actual remaining storage spaces in the retrieval node. In a possible implementation, when the cache space remaining amount in the first retrieval node is greater than zero or the feature library remaining amount is greater than zero, the access node determines that the first retrieval node still has spaces for storing the features. Therefore, the access node allocates the feature to the first retrieval node. In another possible implementation, when the cache space remaining amount is equal to zero and the feature library remaining amount is equal to zero in the first retrieval node, both storage spaces in the first retrieval node have been exhausted, and the access node allocates the features to another retrieval node, for example, a second retrieval node. Because the features are arranged as continuous as possible for storage in the retrieval node, during retrieval on the features in this distributed retrieval system, retrieval results can be obtained at relatively high retrieval efficiency, thereby improving the working efficiency of the distributed retrieval system.

The following describes apparatus embodiments of this application, which can be used for executing the method embodiments of this application. For details not disclosed in the apparatus embodiments of this application, refer to the method embodiments of this application.

Figure 16:
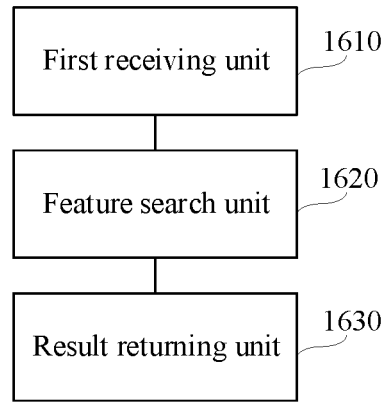
FIG. 16 is a structural block diagram of a distributed retrieval apparatus according to an exemplary embodiment of this application.

FIG. 16 is a structural block diagram of a distributed retrieval apparatus according to an exemplary embodiment of this application. The distributed retrieval apparatus may be implemented as all or a part of a retrieval node by using software, hardware, or a combination thereof. The retrieval node includes at least two video memory blocks. Cache spaces are allocated between the at least two video memory blocks using a blockchain structure. The apparatus includes:

a first receiving unit 1610, configured to receive a retrieval request forwarded by an access node, the retrieval request being used for indicating a to-be-detected feature;

a feature search unit 1620, configured to search the at least two video memory blocks for features matching the to-be-detected feature, the video memory block being a physical storage unit with a fixed length, and the video memory block including a specified quantity of storage units, the storage units corresponding to stored features; and a result returning unit 1630, configured to return retrieval results to the access node, the retrieval results being used for indicating the matching features matching the to-be-detected feature.

In an optional embodiment, the feature search unit 1620 includes an identifier obtaining subunit, configured to obtain a feature library identifier corresponding to the to-be-detected feature; a feature obtaining subunit, configured to obtain features in the video memory block corresponding to the feature library identifier; a calculation subunit, configured to calculate similarities between the features in the video memory block corresponding to the feature library identifier and the to-be-detected feature; and a feature determining subunit, configured to determine first m features with the highest similarities in calculation results as the matching features, m being a positive integer.

In an optional embodiment, the calculation subunit is configured to calculate Euclidean distances between the features in the video memory block corresponding to the feature library identifier and the to-be-detected feature; or calculate cosine distances between the features in the video memory block corresponding to the feature library identifier and the to-be-detected feature.

In an optional embodiment, the apparatus further includes: a second receiving unit, configured to receive a feature insertion request transmitted by the access node, the feature insertion request being used for requesting to insert a first feature into the retrieval node; a first obtaining unit, configured to obtain a released storage unit in the video memory block in response to the feature insertion request, the released storage unit being a storage unit with a data bit zeroed in the video memory block; and a feature insertion unit, configured to insert the first feature into the released storage unit.

In an optional embodiment, the second receiving unit is further configured to receive a feature deletion request transmitted by the access node, the feature deletion request being used for requesting to delete a second feature from the retrieval node; the first obtaining unit is further configured to obtain, in response to the feature deletion request, a storage unit storing the second feature, the storage unit belonging to the video memory block; and the apparatus further includes: a feature deletion unit, configured to zero a data bit of the storage unit storing the second feature; and a labeling unit, configured to label the storage unit storing the second feature as the released storage unit.

In conclusion, in the distributed retrieval apparatus provided in this embodiment of this application, a feature insertion request transmitted by the access node can be received, the feature insertion request being used for requesting to insert a first feature into the retrieval node, a released storage unit in the video memory block can be obtained in response to the feature insertion request, the released storage unit being a storage unit with a data bit zeroed in the video memory block, and the first feature can be inserted into the released storage unit, so that the retrieval node can reuse the storage unit, and does not need to adjust storage locations of features that have been stored when a feature is deleted from the retrieval node, thereby reducing the migration problem and the avalanche effect of the distributed feature library and improving the storage performance of the feature library.

In the distributed retrieval apparatus provided in this embodiment, further, a feature deletion request transmitted by the access node can be received, the feature deletion request being used for requesting to delete a second feature from the retrieval node; a storage unit storing the second feature can be obtained in response to the feature deletion request, the storage unit belonging to the video memory block; a data bit of the storage unit storing the second feature can be zeroed; and the storage unit storing the second feature can be labeled as the released storage unit. Because the retrieval node labels a storage unit occupied by a deleted node instead of releasing the storage unit, the effect of reusing the storage unit during subsequent feature insertion is improved, and the storage performance of the feature library is improved.

Figure 17:
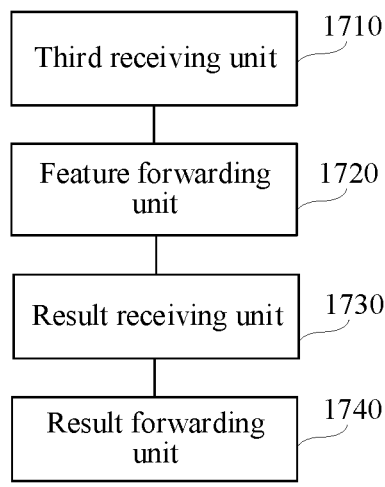
FIG. 17 is a structural block diagram of a distributed retrieval apparatus according to another exemplary embodiment of this application.

FIG. 17 is a structural block diagram of a distributed retrieval apparatus according to another exemplary embodiment of this application. The distributed retrieval apparatus may be implemented as all or a part of access node by using software, hardware, or a combination thereof. The apparatus includes:

a third receiving unit 1710, configured to receive a retrieval request from the outside of a distributed retrieval system, the retrieval request being used for indicating a to-be-detected feature;

a feature forwarding unit 1720, configured to forward the retrieval request to a retrieval node;

a result receiving unit 1730, configured to receive retrieval results returned by the retrieval node, the retrieval results being used for indicating matching features matching the to-be-detected feature, and the retrieval results being the matching features matching the to-be-detected feature found by the retrieval node in at least two video memory blocks, the video memory block including a specified quantity of storage units, the storage units corresponding to stored features, and cache spaces being allocated to the video memory block and the other video memory block in the retrieval node using a blockchain structure; and a result forwarding unit 1740, configured to provide the retrieval results to an object initiating the retrieval request.

In a possible implementation, the apparatus further includes a picture receiving unit, a feature extraction unit, and a feature storage unit. The picture receiving unit is configured to sample pictures; the feature extraction unit is configured to extract features from the sample pictures; and the feature storage unit is configured to store the features in the retrieval node, the retrieval node and the access node belonging to a same distributed retrieval system.

In a possible implementation, the feature storage unit is configured to receive a feature cache request, the feature cache request being used for storing the corresponding features into the retrieval node in the distributed retrieval system; obtain a cache space remaining amount and a feature library remaining amount of a first retrieval node in response to the feature cache request; allocate the features corresponding to the feature cache request to the first retrieval node in response to that the cache space remaining amount is greater than zero or the feature library remaining amount is greater than zero; and allocate the features corresponding to the feature cache request to a second retrieval node in response to that the cache space remaining amount is equal to zero and the feature library remaining amount is equal to zero, the second retrieval node and the first retrieval node belonging to the same distributed retrieval system.

In conclusion, the distributed retrieval apparatus provided in this embodiment of this application can enable the access node to allocate features according to the actual remaining storage spaces in the retrieval node. In a possible implementation, when the cache space remaining amount in the first retrieval node is greater than zero or the feature library remaining amount is greater than zero, the access node determines that the first retrieval node still has spaces for storing the features. Therefore, the access node allocates the feature to the first retrieval node. In another possible implementation, when the cache space remaining amount is equal to zero and the feature library remaining amount is equal to zero in the first retrieval node, both storage spaces in the first retrieval node have been exhausted, and the access node allocates the features to another retrieval node, for example, a second retrieval node. Because the features are arranged as continuous as possible for storage in the retrieval node, during retrieval on the features in this distributed retrieval system, retrieval results can be obtained at relatively high retrieval efficiency, thereby improving the working efficiency of the distributed retrieval system.

Figure 18:
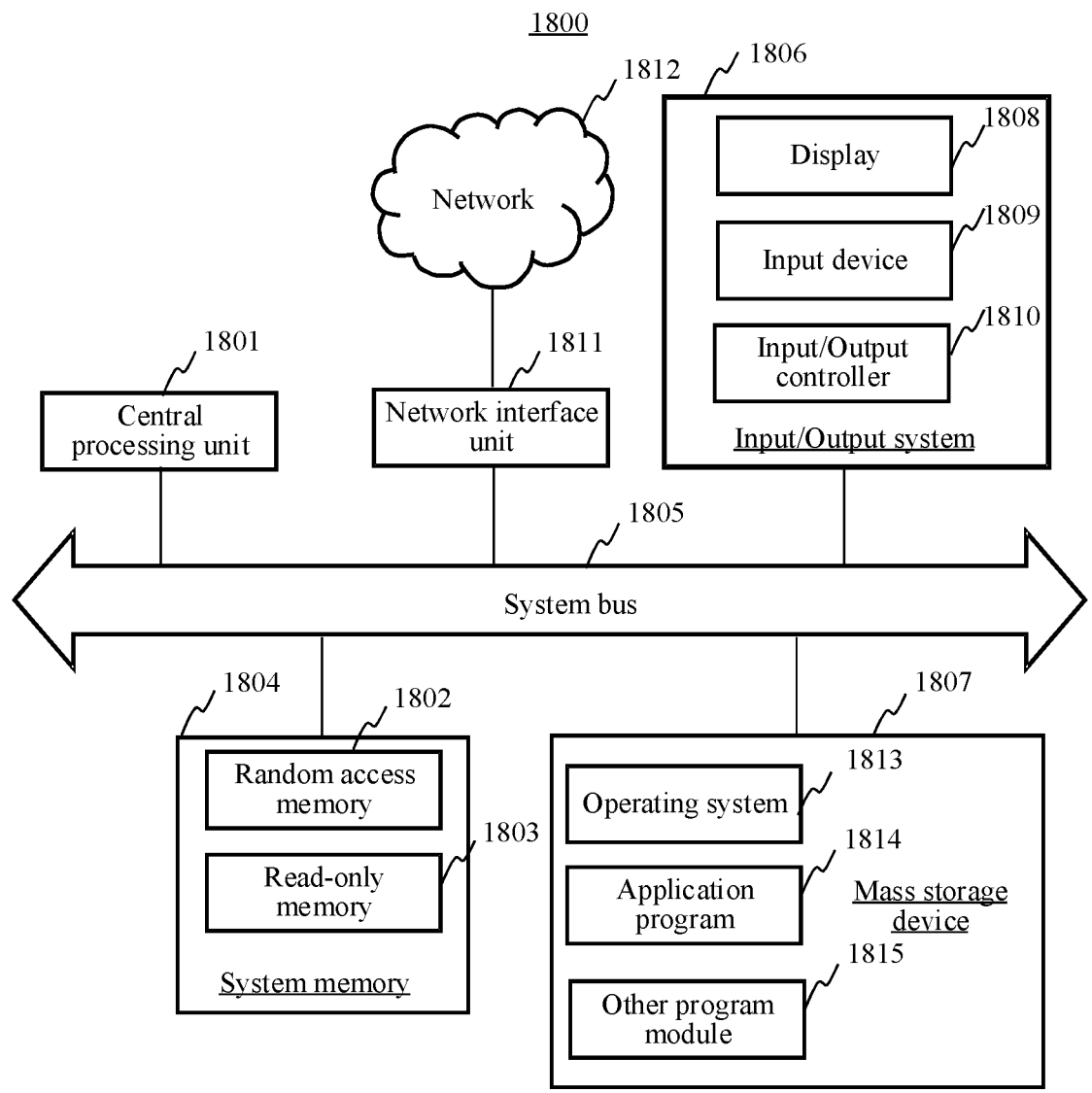
FIG. 18 is a schematic structural diagram of a server according to another embodiment of this application.

FIG. 18 is a schematic structural diagram of a server according to an embodiment of this application. Specifically, a server 1800 includes a CPU 1801, a system memory 1804 including a RAM 1802 and a read-only memory (ROM) 1803, and a system bus 1805 connecting the system memory 1804 and the CPU 1801. The server 1800 further includes a basic input/output system (I/O system) 1806 assisting in transmitting information between devices in a computer, and a large-capacity storage device 1807 configured to store an operating system 1813, an application program 1814 and another program module 1815.

The basic I/O system 1806 includes a display 1808 configured to display information and an input device 1809 such as a mouse or a keyboard that is used for inputting information by a user. The display 1808 and the input device 1809 are both connected to the CPU 1801 by using an input/output controller 1810 connected to the system bus 1805. The basic I/O system 1806 may further include the input/output controller 1810, to receive and process inputs from multiple other devices, such as the keyboard, the mouse, or an electronic stylus. Similarly, the input/output controller 1810 further provides an output to a display screen, a printer or another type of output device.

The mass storage device 1807 is connected to the CPU 1801 by using a mass storage controller (not shown) connected to the system bus 1805. The mass storage device 1807 and a computer-readable medium associated with the mass storage device 1807 provide non-volatile storage for the server 1800. That is, the mass storage device 1807 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in art can learn that the computer storage medium is not limited to the foregoing several types. The system memory 1804 and the mass storage device 1807 may be collectively referred to as a memory.

According to various embodiments of this application, the server 1800 may further be connected, by using a network such as the Internet, to a remote computer on the network and run. That is, the server 1800 may be connected to a network 1812 by using a network interface unit 1811 that is connected to the system bus 1805, or may be connected to a network of another type or a remote computer system (not shown) by using the network interface unit 1811.

An embodiment of this application further provides a non-transitory computer-readable storage medium, storing at least one instruction, the at least one instruction being loaded and executed by a processor to implement the distributed retrieval method described in the foregoing embodiments.

An embodiment of this application further provides a computer program product or a computer program. The computer program product or the computer program includes computer instructions, the computer instructions being stored in a computer-readable storage medium. A processor of a computer device reads the computer instructions from the computer-readable storage medium, and executes the computer instructions, so that the computer device performs the distributed retrieval method provided in the foregoing optional implementations.

When performing the distributed retrieval method, the distributed retrieval apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the distributed retrieval apparatus provided in the foregoing embodiments belong to the same conception as the embodiments of the distributed retrieval methods. For the specific implementation process, reference may be made to the method embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this application can that be implemented, but are not intended to limit this application. Any modification, equivalent replacement, or improvement made within the spirit and principle of this application shall fall within the protection scope of this application.

What is claimed is:

1. A distributed picture retrieval method performed by a computer device acting as a retrieval node, the retrieval node comprising at least two video memory blocks, cache spaces being allocated between the at least two video memory blocks using a blockchain structure, the method comprising:

receiving a retrieval request, the retrieval request being used for indicating a to-be-detected feature of a target object in a picture;

searching the at least two video memory blocks for features matching the to-be-detected feature, each video memory block being a physical storage unit with a fixed length, and the video memory block comprising a specified quantity of storage units, the storage units corresponding to stored features, further comprising:

obtaining a feature library identifier corresponding to the to-be-detected feature:

obtaining features in the video memory block corresponding to the feature library identifier, the features representing objects in pictures stored in the video memory block;

calculating similarities between the features in the video memory block corresponding to the feature library identifier and the to-be-detected feature; and determining first m features with the highest similarities in calculation results as the matching features, m being a positive integer; and returning retrieval results, the retrieval results being used for indicating the matching features of objects in corresponding pictures stored in the at least two video memory blocks.

2. The method according to claim 1, wherein the calculating similarities between the features in the video memory block corresponding to the feature library identifier and the to-be-detected feature comprises:
calculating Euclidean distances between the features in the video memory block corresponding to the feature library identifier and the to-be-detected feature;
or
calculating cosine distances between the features in the video memory block corresponding to the feature library identifier and the to-be-detected feature.

3. The method according to claim 1, further comprising:
receiving a feature insertion request transmitted by the access node, the feature insertion request being used for requesting to insert a first feature into the retrieval node;
obtaining a released storage unit in the video memory block in response to the feature insertion request, the released storage unit being a storage unit with a data bit zeroed in the video memory block; and
inserting the first feature into the released storage unit.

4. The method according to claim 3, further comprising:
receiving a feature deletion request transmitted by the access node, the feature deletion request being used for requesting to delete a second feature from the retrieval node;
obtaining, in response to the feature deletion request, a storage unit storing the second feature, the storage unit belonging to the video memory block;
zeroing a data bit of the storage unit storing the second feature; and
labeling the storage unit storing the second feature as the released storage unit.

5. The method according to claim 1, further comprising:
receiving a feature cache request, the feature cache request being used for storing features corresponding to sample pictures into a distributed retrieval system including the retrieval node;
obtaining a cache space remaining amount and a feature library remaining amount of a first retrieval node in response to the feature cache request;
allocating the features corresponding to the feature cache request to the first retrieval node in response to that the cache space remaining amount is greater than zero or the feature library remaining amount is greater than zero; and
allocating the features corresponding to the feature cache request to a second retrieval node in response to that the cache space remaining amount is equal to zero and the feature library remaining amount is equal to zero, the second retrieval node and the first retrieval node belonging to the same distributed retrieval system.

6. A computer device acting as a retrieval node, the retrieval node comprising at least two video memory blocks, cache spaces being allocated between the at least two video memory blocks using a blockchain structure, the computer device comprising a processor, a memory connected to the processor, and program instructions stored on the memory, the processor, when executing the program instructions, causing the retrieval node to implement a distributed picture retrieval method including:
receiving a retrieval request, the retrieval request being used for indicating a to-be-detected feature of a target object in a picture;
searching the at least two video memory blocks for features matching the to-be-detected feature, each video memory block being a physical storage unit with a fixed length, and the video memory block comprising a specified quantity of storage units, the storage units corresponding to stored features, further comprising:
obtaining a feature library identifier corresponding to the to-be-detected feature;
obtaining features in the video memory block corresponding to the feature library identifier, the features representing objects in pictures stored in the video memory block;
calculating similarities between the features in the video memory block corresponding to the feature library identifier and the to-be-detected feature; and
determining first m features with the highest similarities in calculation results as the matching features, m being a positive integer; and
returning retrieval results, the retrieval results being used for indicating the matching features of objects in corresponding pictures stored in the at least two video memory blocks.

7. The computer device according to claim 6, wherein the calculating similarities between the features in the video memory block corresponding to the feature library identifier and the to-be-detected feature comprises:
calculating Euclidean distances between the features in the video memory block corresponding to the feature library identifier and the to-be-detected feature;
or
calculating cosine distances between the features in the video memory block corresponding to the feature library identifier and the to-be-detected feature.

8. The computer device according to claim 6, wherein the method further comprises:
receiving a feature insertion request transmitted by the access node, the feature insertion request being used for requesting to insert a first feature into the retrieval node;
obtaining a released storage unit in the video memory block in response to the feature insertion request, the released storage unit being a storage unit with a data bit zeroed in the video memory block; and
inserting the first feature into the released storage unit.

9. The computer device according to claim 8, wherein the method further comprises:
receiving a feature deletion request transmitted by the access node, the feature deletion request being used for requesting to delete a second feature from the retrieval node;
obtaining, in response to the feature deletion request, a storage unit storing the second feature, the storage unit belonging to the video memory block;
zeroing a data bit of the storage unit storing the second feature; and
labeling the storage unit storing the second feature as the released storage unit.

10. The computer device according to claim 6, wherein the method further comprises:
receiving a feature cache request, the feature cache request being used for storing features corresponding to sample pictures into a distributed retrieval system including the retrieval node;

obtaining a cache space remaining amount and a feature library remaining amount of a first retrieval node in response to the feature cache request;

allocating the features corresponding to the feature cache request to the first retrieval node in response to that the cache space remaining amount is greater than zero or the feature library remaining amount is greater than zero; and allocating the features corresponding to the feature cache request to a second retrieval node in response to that the cache space remaining amount is equal to zero and the feature library remaining amount is equal to zero, the second retrieval node and the first retrieval node belonging to the same distributed retrieval system.

11. A non-transitory computer-readable storage medium, storing program instructions, the program instructions, when executed by a processor of a computer device acting as a retrieval node, the retrieval node comprising at least two video memory blocks, cache spaces being allocated between the at least two video memory blocks using a blockchain structure, causing the retrieval node to implement a distributed picture retrieval method including:

receiving a retrieval request, the retrieval request being used for indicating a to-be-detected feature of a target object in a picture;

searching the at least two video memory blocks for features matching the to-be-detected feature, each video memory block being a physical storage unit with a fixed length, and the video memory block comprising a specified quantity of storage units, the storage units corresponding to stored features, further comprising:

obtaining a feature library identifier corresponding to the to-be-detected feature;

obtaining features in the video memory block corresponding to the feature library identifier, the features representing objects in pictures stored in the video memory block;

calculating similarities between the features in the video memory block corresponding to the feature library identifier and the to-be-detected feature; and determining first m features with the highest similarities in calculation results as the matching features, m being a positive integer; and returning retrieval results, the retrieval results being used for indicating the matching features of objects in corresponding pictures stored in the at least two video memory blocks.

12. The non-transitory computer-readable storage medium according to claim 11, wherein the calculating similarities between the features in the video memory block corresponding to the feature library identifier and the to-be-detected feature comprises:

calculating Euclidean distances between the features in the video memory block corresponding to the feature library identifier and the to-be-detected feature; or calculating cosine distances between the features in the video memory block corresponding to the feature library identifier and the to-be-detected feature.

13. The non-transitory computer-readable storage medium according to claim 11, wherein the method further comprises:

receiving a feature insertion request transmitted by the access node, the feature insertion request being used for requesting to insert a first feature into the retrieval node;

obtaining a released storage unit in the video memory block in response to the feature insertion request, the released storage unit being a storage unit with a data bit zeroed in the video memory block; and inserting the first feature into the released storage unit.

14. The non-transitory computer-readable storage medium according to claim 13, wherein the method further comprises:

receiving a feature deletion request transmitted by the access node, the feature deletion request being used for requesting to delete a second feature from the retrieval node;

obtaining, in response to the feature deletion request, a storage unit storing the second feature, the storage unit belonging to the video memory block;

zeroing a data bit of the storage unit storing the second feature; and labeling the storage unit storing the second feature as the released storage unit.

15. The non-transitory computer-readable storage medium according to claim 11, wherein the method further comprises:

receiving a feature cache request, the feature cache request being used for storing features corresponding to sample pictures into a distributed retrieval system including the retrieval node;

obtaining a cache space remaining amount and a feature library remaining amount of a first retrieval node in response to the feature cache request;

allocating the features corresponding to the feature cache request to the first retrieval node in response to that the cache space remaining amount is greater than zero or the feature library remaining amount is greater than zero; and allocating the features corresponding to the feature cache request to a second retrieval node in response to that the cache space remaining amount is equal to zero and the feature library remaining amount is equal to zero, the second retrieval node and the first retrieval node belonging to the same distributed retrieval system.

\* \* \* \* \*